US006876390B1

United States Patent
Nagata

(10) Patent No.: US 6,876,390 B1
(45) Date of Patent: Apr. 5, 2005

(54) IMAGE-FORMING OPTICAL SYSTEM

(75) Inventor: Tetsuo Nagata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/541,090

(22) Filed: Mar. 31, 2000

(30) Foreign Application Priority Data

Dec. 7, 1999 (JP) .......................................... 11-347499

(51) Int. Cl.$^7$ .............................................. H04N 5/225
(52) U.S. Cl. .................. 348/335; 348/207.99; 359/637; 359/834
(58) Field of Search ........................... 348/335, 207.99, 348/337, 341, 338, 340; 359/637, 834, 833, 831, 835, 836, 837

(56) References Cited

U.S. PATENT DOCUMENTS

| 3,871,750 | A | * | 3/1975 | Mecklenborg | ............... 359/834 |
| 5,515,208 | A | * | 5/1996 | Yamamoto et al. | ......... 359/740 |
| 6,104,540 | A | * | 8/2000 | Hayakawa et al. | ......... 359/637 |
| 6,310,736 | B1 | * | 10/2001 | Togino | ........................ 359/834 |
| 6,327,094 | B1 | * | 12/2001 | Aoki | ........................... 359/637 |

FOREIGN PATENT DOCUMENTS

JP      10-197797      7/1998

* cited by examiner

Primary Examiner—Tuan Ho
Assistant Examiner—Heather R. Long
(74) Attorney, Agent, or Firm—Pillsbury Winthrop LLP

(57) ABSTRACT

A high-performance and low-cost image-forming optical system with a reduced number of constituent optical elements that is made compact and thin by folding an optical path using reflecting surfaces arranged to minimize the number of reflections. The image-forming optical system has a first prism and a second prism between a stop and an image plane. The first prism includes an entrance surface, a first reflecting surface, a second reflecting surface, and an exit surface. The first reflecting surface and the exit surface are the identical surface. The second prism includes an entrance surface, a first reflecting surface, a second reflecting surface, and an exit surface. In the second prism, the second reflecting surface and the entrance surface are the identical surface.

12 Claims, 11 Drawing Sheets

IMAGE-FORMING OPTICAL SYSTEM

BACKGROUND OF THE INVENTION

The present invention relates to image-forming optical systems. More particularly, the present invention relates to a decentered optical system with a reflecting surface having a power for use in optical apparatus using a small-sized image pickup device, e.g. video cameras, digital still cameras, film scanners, and endoscopes.

Recently, with the achievement of small-sized image pickup devices, image-forming optical systems for use in video cameras, digital still cameras, film scanners, endoscopes, etc. have also been demanded to be reduced in size and weight and also in cost.

In the general rotationally symmetric coaxial optical systems, however, optical elements are arranged in the direction of the optical axis. Therefore, there is a limit to the reduction in thickness of the optical systems. At the same time, the number of lens elements unavoidably increases because it is necessary to correct chromatic aberration produced by a rotationally symmetric refracting lens used in the optical systems. Therefore, it is difficult to reduce the cost in the present state of the art. Under these circumstances, there have recently been proposed optical systems designed to be compact in size by giving a power to a reflecting surface, which produces no chromatic aberration, and folding an optical path in the optical axis direction.

Japanese Patent Application Unexamined Publication (KOKAI) Number [hereinafter referred to as "JP(A)"] 7-333505 proposes to reduce the thickness of an optical system by giving a power to a decentered reflecting surface and folding an optical path. In an example thereof, however, the number of constituent optical members is as large as five, and actual optical performance is unclear. No mention is made of the configuration of the reflecting surface.

JP(A) 8-292371, 9-5650 and 9-90229 each disclose an optical system in which an optical path is folded by a single prism or a plurality of mirrors integrated into a single block, and an image is relayed in the optical system to form a final image. In these conventional examples, however, the number of reflections increases because the image is relayed. Accordingly, surface accuracy errors and decentration accuracy errors are transferred while being added up. Consequently, the accuracy required for each surface becomes tight, causing the cost to increase unfavorably. The relay of the image also causes the overall volumetric capacity of the optical system to increase unfavorably.

JP(A) 9-222563 discloses an example of an optical system that uses a plurality of prisms. However, because the optical system is arranged to relay an image, the cost increases and the optical system becomes large in size unfavorably for the same reasons as stated above.

JP(A) 9-211331 discloses an example of an optical system in which an optical path is folded by using a single prism to achieve a reduction in size of the optical system. However, the optical system is not satisfactorily corrected for aberrations.

JP(A) 10-68887 discloses an example of an optical system capable of image formation without relaying an image by using two prism optical systems. The optical system has a roof surface for erecting an image formed by an objective lens, and this is a design example having a very narrow field angle. In a decentered prism optical system, it is difficult to predict ghost light (stray light). Therefore, it is necessary to minimize the occurrence of ghost light during the design phase. In a particular, in a case where the surface closest to the image plane side is mutually used as a totally reflecting surface and an exit surface as in JP(A) 10-68887, when light rays enter the optical system at somewhat different incident angles, there is a possibility of light passing through the totally reflecting surface to leak into the image pickup surface as ghost light or flare.

Similarly, when a prism is placed closer to the object side than an aperture stop, because the height of extra-axial rays is high, the effective surface area of the prism is inevitably large. Accordingly, ghost light is likely to occur.

When a general refracting optical system is used to obtain a desired refracting power, chromatic aberration occurs at an interface surface thereof according to chromatic dispersion characteristics of an optical element. To correct the chromatic aberration and also correct other ray aberrations, the refracting optical system needs a large number of constituent elements, causing the cost to increase. In addition, because the optical path extends straight along the optical axis, the entire optical system undesirably lengthens in the direction of the optical axis, resulting in an unfavorably large-sized image pickup apparatus.

In decentered optical systems such as those described above in regard to the prior art, an imaged figure or the like is undesirably distorted and the correct shape cannot be reproduced unless the formed image is favorably corrected for aberrations, particularly rotationally asymmetric distortion.

Furthermore, in a case where a reflecting surface is used in a decentered optical system, the sensitivity to decentration errors of the reflecting surface is twice as high as that in the case of a refracting surface, and as the number of reflections increases, decentration errors increase correspondingly because they are transferred while being added up. Consequently, manufacturing accuracy and assembly accuracy, e.g. surface accuracy and decentration accuracy, required for reflecting surfaces become even more strict.

With the recent development of manufacturing techniques, solid-state image pickup devices are reducing in size and becoming higher in definition, year by year. In the present state of the art, the size of one pixel is of the order of several micrometers. In image pickup devices, e.g. CCDs, currently on the digital camera market in particular, those with megapixels are becoming the mainstream. Because such image pickup devices are expected to become even more denser in future, lenses of higher performance will be needed. Thus, it is becoming difficult to ensure the required performance with only one prism.

SUMMARY OF THE INVENTION

In view of the above-described problems associated with the prior art, an object of the present invention is to provide a high-performance and low-cost image-forming optical system using a reduced number of constituent optical elements.

Another object of the present invention is to provide a high-performance image-forming optical system that is made compact and thin by folding an optical path using reflecting surfaces arranged to minimize the number of reflections.

To attain the above-described objects, the present invention provides an image-forming optical system for forming an image of an object. The image-forming optical system has at least a stop and further has at least a first prism and a second prism between the stop and an image plane.

The first prism includes, in order from the object side, a first prism entrance surface through which a light beam passing through the stop enters the first prism, and a first prism first reflecting surface that reflects the light beam entering the first prism. The first prism further includes a first prism second reflecting surface that reflects the light beam reflected by the first prism first reflecting surface, and a first prism exit surface through which the light beam reflected by the first prism second reflecting surface exits from the first prism.

The first prism first reflecting surface and the first prism exit surface are formed from the identical surface. The light beam entering through the first prism entrance surface is incident on the first prism exit surface at an angle exceeding the total reflection critical angle, thereby allowing the first prism exit surface to produce a reflecting action so as to function as the first prism first reflecting surface.

The second prism includes a second prism entrance surface through which the light beam exiting from the first prism exit surface enters the second prism, and a second prism first reflecting surface that reflects the light beam entering the second prism. The second prism further includes a second prism second reflecting surface that reflects the light beam reflected by the second prism first reflecting surface, and a second prism exit surface through which the light beam reflected by the second prism second reflecting surface exits from the second prism.

The second prism second reflecting surface and the second prism entrance surface are formed from the identical surface. The light beam reflected from the second prism first reflecting surface is incident on the second prism entrance surface at an angle exceeding the total reflection critical angle, thereby allowing the second prism entrance surface to produce a reflecting action so as to function as the second prism second reflecting surface.

The reasons for adopting the above-described arrangements in the present invention, together with the functions thereof, will be described below in order.

The image-forming optical system according to the present invention, which is provided to attain the above-described objects, is an image-forming optical system for forming an image of an object. The image-forming optical system has at least a stop and further has at least a first prism and a second prism between the stop and an image plane.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors, etc., which are placed in the air.

In addition, an image-forming optical system is required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

Accordingly, the present invention adopts an arrangement in which two prisms are placed on the image-plane side of the stop, thereby enabling not only axial aberrations but also off-axis aberrations to be favorably corrected. In the case of an arrangement using only one prism, off-axis aberrations are unavoidably aggravated.

For the reasons stated above, the present invention adopts an arrangement in which the image-forming optical system has at least a first prism and a second prism between a stop and an image plane. Adopting such a basic arrangement makes it possible to obtain a compact image-forming optical system that has a smaller number of constituent optical elements than in the case of a refracting optical system and exhibits favorable performance throughout the image field, from the center to the periphery thereof.

Incidentally, the first prism in the present invention includes, in order from the object side, a first prism entrance surface through which a light beam passing through the stop enters the first prism, and a first prism first reflecting surface that reflects the light beam entering the first prism. The first prism further includes a first prism second reflecting surface that reflects the light beam reflected by the first prism first reflecting surface, and a first prism exit surface through which the light beam reflected by the first prism second reflecting surface exits from the first prism. The first prism first reflecting surface and the first prism exit surface are formed from the identical surface. The light beam entering through the first prism entrance surface is incident on the first prism exit surface at an angle exceeding through the total reflection critical angle, thereby allowing the first prism exit surface to produce a reflecting action so as to function as the first prism first reflecting surface. It is desirable that at least the first prism second reflecting surface should be formed with a rotationally asymmetric curved surface configuration that corrects aberrations due to decentration.

When a light ray from the object center that passes through the center of the stop and reaches the center of the image plane is defined as an axial principal ray (optical axis), if at least one reflecting surface is not decentered with respect to the axial principal ray, the axial principal ray travels along the same optical path when incident on and reflected from the reflecting surface, and thus the axial principal ray is intercepted in the optical system undesirably. As a result, an image is formed from only a light beam whose central portion is shaded. Consequently, the center of the image is unfavorably dark, or no image is formed in the center of the image field.

It is also possible to decenter a reflecting surface with a power with respect to the axial principal ray.

When a reflecting surface with a power is decentered with respect to the axial principal ray, it is desirable that at least one of the surfaces constituting the prism used in the present invention should be a rotationally asymmetric surface. It is particularly preferable from the viewpoint of correcting rotationally asymmetric decentration aberrations that the first prism second reflecting surface, which is assigned the greater part of the power (refracting power) of the first prism, should be formed into a rotationally asymmetric surface having no axis of rotational symmetry.

A free-form surface used in the present invention as a rotationally asymmetric surface having no axis of rotational symmetry is defined by the following equation. The Z-axis of the defining equation is the axis of the free-form surface.

$$Z = cr^2 / \left[1 + \sqrt{\{1 - (1+k)c^2 r^2\}}\right] + \sum_{j=2}^{66} C_j X^m Y^n \quad (a)$$

In Eq. (a), the first term is a spherical surface term, and the second term is a free-form surface term.

In the spherical surface term:
c: the curvature at the vertex
k: a conic constant
$r = \sqrt{(X^2 + Y^2)}$
The free-form surface term is given by $$\sum_{j=2}^{66} C_j X^m Y^n = C_2 X + C_3 Y + C_4 X'^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 + C_{15} Y^4 +$$
$$C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 +$$
$$C_{30} X^6 Y + C_{31} X^5 Y^2 + C_{32} X^4 Y^3 + C_{33} X^3 Y^4 +$$
$$C_{34} X^2 Y^5 + C_{35} XY^6 + C_{36} Y^7$$

where Cj (j is an integer of 2 or higher) are coefficients.

In general, the above-described free-form surface does not have planes of symmetry in both the XZ- and YZ-planes. A free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

The above-described free-form surface as a rotationally asymmetric surface having no axis of rotational symmetry may also be defined by Zernike polynomials. That is, the configuration of the free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$x = R \times \cos(A)$
$y = R \times \sin(A)$
$Z = D_2$
  $+ D_3 R \cos(A) + D_4 R \sin(A)$
  $+ D_5 R^2 \cos(2A) + D_6 (R^2 - 1) + D_7 R^2 \sin(2A)$
  $+ D_{12} R^3 \cos(3A) + D_9 (3R^3 - 2R)\cos(A)$
  $+ D_{10}(3R^3 - 2R)\sin(A) + D_{11} R^3 \sin(3A)$
  $+ D_{12} R^4 \cos(4A) + D_{13} (4R^4 - 3R^2)\cos(2A)$
  $+ D_{14}(6R^4 - 6R^2 +) + D_{15}(4R^4 - 3R^2)\sin(2A)$
  $+ D_{16} R^4 \sin(4A)$
  $+ D_{17} R^5 \cos(5A) + D_{18}(5R^5 - 4R^3)\cos(3A)$
  $+ D_{19} (10R5 - 12R^3 + 3R)\cos(A)$
  $+ D_{20} (10R^{5-} 12R^3 + 3R)\sin(A)$
  $+ D_{21} (5R^5 - 4R^3)\sin(3A) + D_{22} R^5 \sin(5A)$
  $+ D_{23} R^6 \cos(6A) + D_{24} (6R^6 - 5R^4)\cos(4A)$
  $+ D_{25} (15R^6 - 20R^4 + 6R^2)\cos(2A)$
  $+ D_{26}(20R^6 - 30R^4 + 12R^2 - 1)$
  $+ D_{27}(15R^6 - 20R^4 + 6R^2)\sin(2A)$
  $+ D_{28}(6R^6 - 5R^4)\sin(4A) + D_{29} R^6 \sin(6A)$.
  (b)

where $D_m$ (m is an integer of 2 or higher) are coefficients.

It should be noted that to design an optical system symmetric with respect to the X-axis direction, $D_4$, $D_5$, $D_6$, $D_{10}$, $D_{10}$, $D_{12}$, $D_{13}$, $D_{14}$, $D_{20}$, $D_{21}$, $D_{22}$ . . . should be used.

It should be noted that the above defining equations are shown as merely examples of equations defining a rotationally asymmetric surface having no axis of rotational symmetry, and the same advantageous effect can be obtained for any other defining equation that expresses such a rotationally asymmetric surface. It is preferable that the rotationally asymmetric surface should be a rotationally asymmetric surface having no axis of rotational symmetry in the surface nor out of the surface. Such a rotationally asymmetric surface allows the degree of freedom to increase, and this is favorable for aberration correction.

The second prism in the present invention includes a second prism entrance surface through which the light beam exiting from the first prism exit surface enters the second prism, and a second prism first reflecting surface that reflects the light beam entering the second prism. The second prism further includes a second prism second reflecting surface that reflects the light beam reflected by the second prism first reflecting surface, and a second prism exit surface through which the light beam reflected by the second prism second reflecting surface exits from the second prism. The second prism second reflecting surface and the second prism entrance surface are formed from the identical surface. The light beam reflected from the second prism first reflecting surface is incident on the second prism entrance surface at an angle exceeding the total reflection critical angle, thereby allowing the second prism entrance surface to produce a reflecting action so as to function as the second prism second reflecting surface. It is desirable that at least the second prism first reflecting surface should be formed with a rotationally asymmetric curved surface configuration that corrects aberrations due to decentration for the same reasons stated above with respect to the first prism.

In the above-described image-forming optical system according to the present invention, when a light ray connecting the center of the stop and the image center is defined as an optical axis, it is desirable from the design and manufacturing point of view to arrange the optical system so that the segments of the optical axis folded by passing through the first prism and the second prism from the stop are all in approximately one plane.

It is also desirable that the configuration of the first prism second reflecting surface in a plane containing the optical axis folded in the first prism should have a reflecting surface configuration that gives a negative power to the light beam, and that the configuration of the second prism first reflecting surface in a plane containing the optical axis folded in the second prism should have a reflecting surface configuration that gives a positive power to the light beam.

In the configurations of the first and second prisms in the present invention, the first prism second reflecting surface is assigned the greater part of the power of the first prism, and the second prism first reflecting surface is assigned the greater part of the power of the second prism. Therefore, with the structure in which the first prism second reflecting surface has a reflecting surface configuration that gives a negative power to the light beam and the second prism first reflecting surface has a reflecting surface configuration that gives a positive power to the light beam, the optical system is arranged in the form of a retrofocus type. Accordingly, it is possible to ensure a back focus for inserting an optical element, e.g. a filter.

Let us define the powers of the image-forming optical system according to the present invention and those of the prisms constituting the image-forming optical system. As shown in FIG. 13, when the direction of decentration of the image-forming optical system S is taken in the Y-axis direction, a light ray which is parallel to the axial principal ray of the image-forming optical system S and which has a small height d in the YZ-plane is made to enter the image-forming optical system S from the object side thereof. The angle that is formed between that ray and the axial principal ray exiting from the image-forming optical system S as the two rays are projected onto the YZ-plane is denoted by δy, and δy/d is defined as the power Py in the Y-axis direction of the image-forming optical system S. Similarly, a light ray which is parallel to the axial principal ray of the image-forming optical system S and which has a small height d in the X-axis direction, which is perpendicular to the YZ-plane, is made to enter the image-forming optical system S from the object side thereof. The angle that is formed between that ray and the axial principal ray exiting from the image-forming optical system S as the two rays are projected onto a plane perpendicularly intersecting the YZ-plane and containing the axial principal ray is denoted by δx, and δx/d is defined as the power Px in the X-axis direction of the image-forming optical system S. Similarly, the powers P1y and P2y in the Y-axis direction and powers P1x and P2x in the X-axis direction of the first and second prisms constituting the image-forming optical system S are defined.

Furthermore, the reciprocals of the powers of the image-forming optical system S are defined as the focal length Fy in the Y-axis direction of the image-forming optical system S and the focal length Fx in the X-axis direction of the image-forming optical system S.

When the decentration direction of the entire optical system is a Y-axis direction, and a plane parallel to a light ray connecting the center of the stop and the image center is a YZ-plane, and further a direction perpendicularly intersecting the YZ-plane is an X-axis direction, it is desirable for the first prism and the second prism to be arranged so as to satisfy the following conditions (1) and (2):

$$P1x < P2x \quad (1)$$

$$P1y < P2y \quad (2)$$

where P1x and P1y are the powers in the X- and Y-axis directions, respectively, of the first prism; P2x and P2y are the powers in the X- and Y-axis directions, respectively, of the second prism; and Px and Py are the powers in the X- and Y-axis directions, respectively, of the entire optical system.

The conditions (1) and (2) define the power distribution to the first prism and the second prism. If the first prism is greater in power than the second prism, it becomes impossible to ensure the required back focus, unfavorably.

If the first prism has a large power, the power of the second prism inevitably becomes small or negative. Accordingly, such a power distribution makes it difficult to ensure the telecentricity, and color shading of an image pickup device, e.g. a CCD, occurs unfavorably.

It is desirable for the first prism and the second prism to be arranged so as to satisfy the following conditions (3) and (4):

$$0 \leq \theta 1 \leq 25° \quad (3)$$

$$0 \leq \theta 2 \leq 25° \quad (4)$$

where θ1 is the angle formed between the optical axis and a line normal to the exit surface of the first prism at a point where the optical axis exits from the first prism, and θ2 is the angle formed between the optical axis and a line normal to the entrance surface of the second prism at a point where the optical axis enters the second prism.

It is deemed that θ1 and θ2 defined as stated above have no signs because they are angles each formed between a ray and a line normal to a surface.

When two or more prisms are used, relative positioning of the prisms has a larger effect on the performance than in the case of an ordinary coaxial optical system. From the viewpoint of minimizing the effect, it is desirable to reduce the exit angle and incident angle of a reference ray (axial principal ray) in the two prisms. If θ1 or θ2 exceeds the upper limit of each condition, i.e. 25°, performance degradation due to errors in assembling of the two prisms becomes very large, unfavorably.

It is more desirable to satisfy the following conditions:

$$0 \leq \theta 1 \leq 15° \quad (5)$$

$$0 \leq \theta 2 \leq 15° \quad (6)$$

It is even more desirable to satisfy the following conditions:

$$0 \leq \theta 1 \leq 10° \quad (7)$$

$$0 \leq \theta 2 \leq 10° \quad (8)$$

It is also desirable to satisfy the following conditions:

$$-1.0 < P1x/Px < 1.0 \quad (9)$$

$$-1.0 < P1y/Py < 1.0 \quad (10)$$

In the conditions (9) and (10), the power of the first prism is standardized by the power of the entire optical system. If P1x/Px or P1y/Py is not smaller than the upper limit of each of the conditions, i.e. 1.0, it becomes impossible to ensure the required back focus and hence impossible to insert filters, e.g. an IR (infrared) cutoff filter and a low-pass filter.

If P1x/Px or P1y/Py is not larger than the lower limit, i.e., −1.0, the negative power of the first prism becomes large, and it becomes necessary to increase the power of the second prism in accordance with the power of the first prism. Consequently, the powers of the surfaces of the two prisms become unfavorably strong, and the amount of decentration aberrations produced by each surface becomes unfavorably large. Because the first prism is on the image side of the stop, if the negative power is made excessively large, the angle of extra-axial rays widens excessively. Consequently, the two prisms become large in size, and it becomes impossible to attain the objects of the present invention.

It is also desirable to satisfy the following conditions:

$$0<P2x/Px<3.0 \quad (11)$$

$$0<P2y/Py<3.0 \quad (12)$$

In the conditions (11) and (12), the power of the second prism is standardized by the power of the entire optical system. If P2x/Px or P2y/Py is not smaller than the upper limit of each of the conditions, i.e. 3.0, the power of each surface of the second prism becomes very strong. Consequently, it becomes difficult to effect aberration correction.

If P2x/Px or P2y/Py is not larger than the lower limit of each of the conditions (11) and (12), i.e. 0, the power of the entire optical system is one-sided to the first prism. Accordingly, it becomes difficult to ensure the required back focus.

Regarding the conditions (9) and (10), it is more desirable to satisfy the following conditions:

$$-0.5<P1x/Px<0.5 \quad (13)$$

$$-0.5<P1y/Py<0.5 \quad (14)$$

Regarding the conditions (11) and (12), it is more desirable to satisfy the following conditions:

$$0.5<P2x/Px<2.0 \quad (15)$$

$$0.5<P2y/Py<2.0 \quad (16)$$

Regarding the conditions (9) and (10), it is even more desirable to satisfy the following conditions:

$$-0.3<P1x/Px<0.2 \quad (17)$$

$$-0.3<P1y/Py<0.2 \quad (18)$$

Regarding the conditions (11) and (12), it is even more desirable to satisfy the following conditions:

$$1.0<P2x/Px<1.8 \quad (19)$$

$$1.0<P2y/Py<1.8 \quad (20)$$

Incidentally, it is desirable to arrange the image-forming optical system according to the present invention so that the optical axis passing through the stop and entering through the first prism entrance surface and the optical axis exiting from the second prism exit surface should be approximately parallel to each other. With this arrangement, there is no change in the visual field even when the optical system is moved for focusing.

It is desirable to arrange the first prism and the second prism so that the first prism exit surface and the second prism entrance surface should face each other. This is an arrangement in which an optical element for bending the optical axis, such as a reflecting mirror, is not placed between the two prisms. With this arrangement, the optical system can be arranged in a compact form.

Regarding the external configuration of the entire optical system, it is desirable to arrange the optical system so that the first prism entrance surface and the second prism exit surface should face opposite to each other, and the first prism second reflecting surface and the second prism first reflecting surface should face opposite to each other. With this external configuration, the entire optical system can be arranged in a compact form.

It is desirable that the configuration of the first prism entrance surface in a plane containing the optical axis folded by passing through the first prism and the second prism from the stop should be a surface configuration having a convex surface directed toward the object side to give a positive power to the light beam, and the configuration of the second prism exit surface should be an approximately flat surface configuration. If the first prism entrance surface has a configuration with a convex surface directed toward the object side to give a positive power to the light beam, it is easy to effect aberration correction in the first prism, and it is possible to reduce the amount of aberrations produced in the first prism. Accordingly, the above-described arrangement is favorable. By forming the second prism exit surface into an approximately flat surface configuration, it becomes easy to unite the second prism and filters placed on the exit side thereof or a cover glass of an image pickup device, e.g. a CCD, by bonding or the like.

It should be noted that an optical element having a refracting power, e.g. a lens, can be placed on the object side of the first prism. It is also possible to place such an optical element between the first prism and the second prism or on the exit side of the second prism.

Incidentally, an electronic image pickup apparatus can be constructed on the basis of the present invention. The electronic image pickup apparatus has an electronic image pickup device having a light-receiving surface placed in an image plane formed by an image-forming optical system according to the present invention arranged as stated above. The electronic image pickup apparatus further has a display device for displaying an image, and a signal processing circuit for performing signal processing to display an object image received with the electronic image pickup device on the display device.

In addition, a compact photographic apparatus can be constructed on the basis of the present invention. The photographic apparatus includes an image-forming optical system according to the present invention arranged as stated above, and an electronic image pickup device placed at a position where it receives an object image formed by the image-forming optical system. The photographic apparatus further includes a processing device for processing an electronic signal obtained through photoelectric conversion by the electronic image pickup device. The optical path is folded in the first and second prisms and the first and second prisms are placed close to each other in a direction (Z-axis direction) in which the distance (D) from the stop of the image-forming optical system to the electronic image pickup device is reduced so that the distance (D) is 25 millimeters or less (D≦25 millimeters). Furthermore, the first prism and the second prism are arranged so that the distance D is 3 millimeters or more (D≦3 millimeters) to lead a light beam having a field angle of at least 10° (ω≧10°) to the electronic image pickup device by folding it in the first and second prisms.

If the distance D from the stop to the electronic image pickup device is longer than 25 millimeters, it is impossible to construct an image-forming optical system of smaller size than a coaxial optical system comprising lenses. If the field angle is less than 100 (200 or more in full field angle), it becomes difficult to image the whole subject at close range. If the distance D is less than 3 millimeters, it becomes difficult to construct the optical system. In addition, it becomes difficult to obtain satisfactorily high resolution by using an existing electronic image pickup device.

In this case, it is more desirable to fold the optical path in the first and second prisms and to place the first and second prisms close to each other in a direction (Z-axis direction) in which the distance D is reduced so that the distance (D) is 15 millimeters or less (D≦15 millimeters).

An information processing apparatus can be constructed on the basis of the present invention. The information processing apparatus includes an image-forming optical system according to the present invention arranged as stated above, and an electronic image pickup device placed at a position where it receives an object image formed by the image-forming optical system. The information processing apparatus further includes a processing device for processing an electronic signal obtained through photoelectric conversion by the electronic image pickup device, and an input unit used by an operator to input a desired information signal to the processing device. Further, the information processing apparatus includes a display device for displaying an output from the processing device, and a recording medium for recording the output from the processing device. The processing device is arranged to display the object image received with the electronic image pickup device on the display device.

In this case, a personal computer system can be constructed on the basis of the present invention. In the personal computer system, the input unit of the information processing apparatus is a keyboard, and the image-forming optical system and the electronic image pickup device are incorporated in the peripheral portion of the display device or in the peripheral portion of the keyboard.

It is also possible to construct a telephone apparatus on the basis of the present invention. The telephone apparatus includes an image-forming optical system according to the present invention arranged as stated above, and an electronic image pickup device placed at a position where it receives an object image formed by the image-forming optical system. The telephone apparatus further includes an antenna for transmitting and receiving telephone signals, and an input unit for inputting signals, e.g. a telephone number. Further, the telephone apparatus includes a signal processing unit for converting the object image received with the electronic image pickup device into a transmittable signal.

It is also possible to construct an information reproducing apparatus on the basis of the present invention. The information reproducing apparatus includes an image-forming optical system according to the present invention arranged as stated above, and an electronic image pickup device placed at a position where it receives an object image formed by the image-forming optical system. The information reproducing apparatus further includes an illuminating member for illuminating an object having a sound signal recorded in the form of a bar code or a dot pattern. Further, the information reproducing apparatus includes a processing device for performing speech recognition of the sound signal received in the form of the object image by the electronic image pickup device from the object having the sound signal recorded in the form of a bar code or a dot pattern, and a sound generating member for transmitting the recognized sound signal to an operator's ear as a sound.

It is also possible to construct an electronic camera apparatus on the basis of the present invention. The electronic camera apparatus has an image-forming optical system according to the present invention arranged as stated above, and an electronic image pickup device placed at a position where it receives an object image formed by the image-forming optical system. The electronic camera apparatus further has a processing device for processing an electronic signal obtained through photoelectric conversion by the electronic image pickup device, and a display device for observably displaying the object image received with the electronic image pickup device. The electronic camera apparatus incorporates a recording member for recording image information concerning the object image received with the electronic image pickup device. Alternatively, the electronic camera apparatus is arranged such that the recording member is removably loaded thereinto. The processing device has a display processing function to display the object image received with the electronic image pickup device on the display device and a recording processing function to record the object image received with the electronic image pickup device onto the recording medium.

The above-described apparatuses can be arranged so that a photographing window of the apparatus is used as the stop of the image-forming optical system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 and 2 of the image-forming optical system according to the present invention will be described below.

Figure 1:
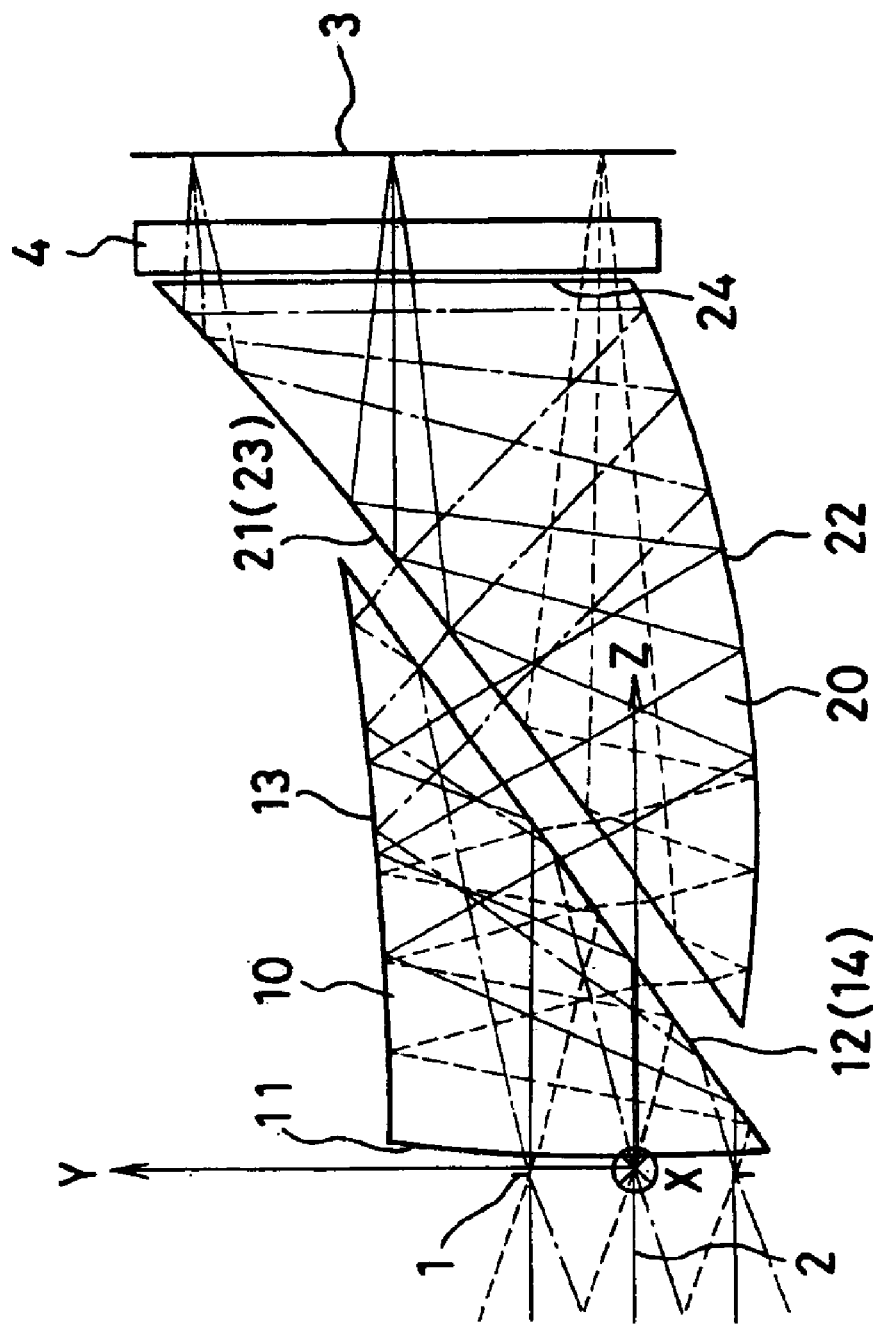
FIG. 1 is a sectional view of an image-forming optical system according to Example 1 of the present invention.

Constituent parameters of Examples 1 and 2 will be shown later. In the constituent parameters, surface Nos. are shown as surface Nos. in forward ray tracing from an object through a stop 1 to an image plane 3. Regarding the definition of coordinates, as shown in FIG. 1, an axial principal ray 2 is defined by a light ray passing through the center of the stop 1 and reaching the center of the image plane 3 (the image pickup surface of an image pickup device). An intersection between the axial principal ray 2 and the plane of the stop 1 is defined as the origin of a decentered optical surface. The direction along the axial principal ray 2 is defined as a positive direction of a Z-axis. A plane containing both the Z-axis and the center of the image plane 3 is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis. The optical axis is assumed to be folded in the YZ-plane, which is parallel to the plane of the figure.

In the constituent parameters (shown later), each decentered surface is given displacements in the X-, Y- and Z-axis directions (X, Y and Z, respectively) of the vertex position of the surface from the origin of the coordinate system determined with respect to the center of the stop 1, and tilt angles (degrees) of the center axis of the surface [the Z-axis of the above equation (a) in regard to free-form surfaces; the Z-axis of the following equation (c) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive y means clockwise rotation relative to the positive direction of the Z-axis.

Among optical surfaces constituting the optical system in each example, a specific surface (including a hypothetical plane) and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z=(y^2/R)/[1+(1-(1+K)y^2/R^2)^{1/2}]+Ay^4+By^6+Cy^8+Dy^{10}+ \ldots \quad (c)$$

In the above equation, Z is an optical axis (axial principal ray) for which the direction of travel of light is defined as a positive direction, and y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Other free-form surface defining equations include Zernike polynomials given by the above-described equation (b).

Other examples of surfaces usable in the present invention are expressed by the following defining equation (d):

$$Z=\Sigma\Sigma C_{nm}XY$$

Assuming that k=7 (polynomial of degree 7), for example, a free-form surface is expressed by an expanded form of the above equation as follows:

$$\begin{aligned}
Z=&C_2\\
&+C_3Y+C_4|x|\\
&+C_5y^2+C_6y|x|+C_7x^2\\
&+C_8y^3+C_9y^2\,|x|+C_{10}yx^2+C_{11}|x^3|\\
&+C_{12}y^4+C_{13}y^3\,|x|+C_{14}y^2x^2+C_{15}y|x^3|+C_6x^4\\
&+C_{17}y^5+C_{18}y^4\,|x|+C_{19}y^3x^2+C_{20}y^2|x^3|\\
&\quad+C_{21}yx^4+C_{22}|x^5|\\
&+C_{23}y^6+C_{24}y^5|x|+C_{25}y^4x^2+C_{26}y^3|x^3|\\
&\quad+C_{27}y^2x^4+C_{28}y|x^5|+C_{29}x^6\\
&+C_{30}y^7+C_{31}y^6\,|x|+C_{32}y^5x^2+C_{33}y^4|x^3|\\
&\quad+C_{34}y^3x^4+C_{35}y^2|x^5|+C_{36}yx^6+C_{37}\,|x^7|
\end{aligned} \quad (d)$$

Although in the examples of the present invention the surface configuration is expressed by a free-form surface using the above equation (a), it should be noted that the same advantageous effect can be obtained by using the above equation (b) or (d), as a matter of course.

In Example 1, the size of the image pickup surface is 5.4×4.0 millimeters. The horizontal field angle is 46.9°, and the vertical field angle is 35.6°. The entrance pupil diameter is 2.12 millimeters, and F-number is equivalent to 3.0. As shown in FIG. 1, which is a sectional view taken along the YZ-plane containing the axial principal ray, the image-forming optical system according to Example 1 has, in order in which light passes from the object side, a stop 1, a first prism 10, a second prism 20, a cover glass 4 of an image pickup device, and an image plane (image-formation plane) 3. The first prism 10 comprises a first surface 11 to a fourth surface 14. The first surface 11 is an entrance surface. The second surface 12 is a first reflecting surface. The third surface 13 is a second reflecting surface. The fourth surface 14 is an exit surface. Rays from the object passing through the stop 1 enter through the entrance surface 11 and are successively reflected by the first reflecting surface 12 and the second reflecting surface 13 to exit from the exit surface 14. The second prism 20 comprises a first surface 21 to a fourth surface 24. The first surface 21 is an entrance surface. The second surface 22 is a first reflecting surface. The third surface 23 is a second reflecting surface. The fourth surface 24 is an exit surface. Rays from the first prism 10 enter through the entrance surface 21 and are successively reflected by the first reflecting surface 22 and the second reflecting surface 23 to exit from the exit surface 24. The first reflecting surface 12 and exit surface 14 of the first prism 10 are the identical optical surface having both a transmitting action and a totally reflecting action. Similarly, the entrance surface 21 and second reflecting surface 23 of the second prism 20 are the identical optical surface having both a transmitting action and a totally reflecting action. It should be noted that the exit surface 24 of the second prism 20 is a plane surface.

In the constituent parameters (shown later), the displacements of each of the surface Nos. 2 to 12 are expressed by the amounts of displacement from the plane of the stop 1 of surface No. 1.

Figure 2:
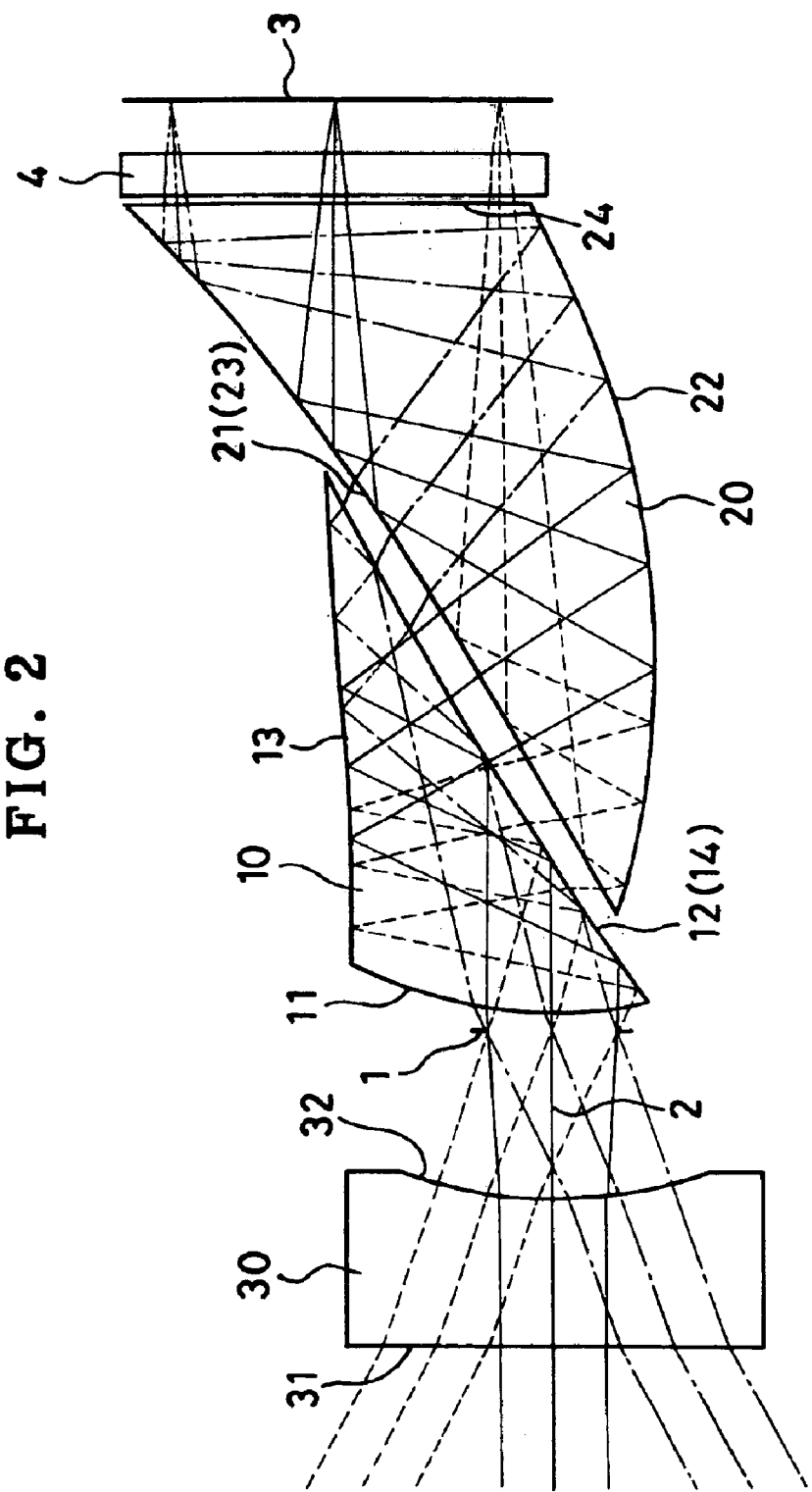
FIG. 2 is a sectional view of an image-forming optical system according to Example 2 of the present invention.

In Example 2, the size of the image pickup surface is 5.4x4.0 millimeters. The horizontal field angle is 65.40, and the vertical field angle is 51.0°. The entrance pupil diameter is 1.41 millimeters, and F-number is equivalent to 3.3. As shown in FIG. 2, which is a sectional view taken along the YZ-plane containing the axial principal ray, the image-forming optical system according to Example 2 has, in order in which light passes from the object side, a rotationally symmetric negative lens 30 in which a first surface 31 is a concave aspherical surface and a second surface 32 is a concave spherical surface, a stop 1, a first prism 10, a second prism 20, a cover glass 4 of an image pickup device, and an image plane (image-formation plane) 3. The first prism 10 comprises a first surface 11 to a fourth surface 14. The first surface 11 is an entrance surface. The second surface 12 is a first reflecting surface. The third surface 13 is a second reflecting surface. The fourth surface 14 is an exit surface. Rays from the object passing through the negative lens 30 and the stop 1 enter through the entrance surface 11 and are successively reflected by the first reflecting surface 12 and the second reflecting surface 13 to exit from the exit surface 14. The second prism 20 comprises a first surface 21 to a fourth surface 24. The first surface 21 is an entrance surface. The second surface 22 is a first reflecting surface. The third surface 23 is a second reflecting surface. The fourth surface 24 is an exit surface. Rays from the first prism 10 enter through the entrance surface 21 and are successively reflected by the first reflecting surface 22 and the second reflecting surface 23 to exit from the exit surface 24. The first reflecting surface 12 and exit surface 14 of the first prism 10 are the identical optical surface having both a transmitting action and a totally reflecting action. Similarly, the entrance surface 21 and second reflecting surface 23 of the second prism 20 are the identical optical surface having both a transmitting action and a totally reflecting action. It should be noted that the exit surface 24 of the second prism 20 is a plane surface.

In the constituent parameters (shown later), the surface Nos. 1 to 3 are shown according to the conventional notation for coaxial optical systems, and the displacements of each of the surface Nos. 4 to 14 (image plane) are expressed by the amounts of displacement from the plane of the stop 1 of surface No. 3.

Constituent parameters of the above-described Examples 1 and 2 are as follows. In the tables below, "FFS" denotes a free-form surface, and "ASS" denotes an aspherical surface.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 55.8 |
| 3 | FFS② | | (2) | 1.5254 | 55.8 |
| 4 | FFS③ | | (3) | 1.5254 | 55.8 |
| 5 | FFS② | | (2) | | |
| 6 | FFS④ | | (4) | 1.5254 | 55.8 |
| 7 | FFS⑤ | | (5) | 1.5254 | 55.8 |
| 8 | FFS④ | | (4) | 1.5254 | 55.8 |
| 9 | ∞ | | (6) | | |
| 10 | ∞ | | (7) | 1.5163 | 64.1 |
| 11 | ∞ | | (8) | | |
| Image plane | ∞ | | (9) | | |

FFS①

| $C_4$ | $5.4038 \times 10^{-2}$ | $C_6$ | $1.8678 \times 10^{-2}$ | | |

FFS②

| $C_4$ | $1.2719 \times 10^{-3}$ | $C_6$ | $-2.0180 \times 10^{-3}$ | $C_8$ | $6.9200 \times 10^{-4}$ |
| $C_{10}$ | $-3.2115 \times 10^{-4}$ | $C_{11}$ | $-1.7770 \times 10^{-4}$ | $C_{13}$ | $9.7017 \times 10^{-5}$ |
| $C_{15}$ | $-1.5867 \times 10^{-5}$ | | | | |

FFS③

| $C_4$ | $-1.7204 \times 10^{-2}$ | $C_6$ | $-1.1421 \times 10^{-2}$ | $C_8$ | $2.6819 \times 10^{-3}$ |
| $C_{10}$ | $-6.9701 \times 10^{-4}$ | $C_{11}$ | $-3.2922 \times 10^{-4}$ | $C_{13}$ | $1.9243 \times 10^{-4}$ |
| $C_{15}$ | $-3.7214 \times 10^{-5}$ | | | | |

FFS④

| $C_4$ | $-2.3174 \times 10^{-2}$ | $C_6$ | $-4.5848 \times 10^{-3}$ | $C_8$ | $-2.2925 \times 10^{-4}$ |
| $C_{10}$ | $-5.4406 \times 10^{-4}$ | $C_{11}$ | $1.7325 \times 10^{-4}$ | $C_{13}$ | $-4.0761 \times 10^{-6}$ |
| $C_{15}$ | $-3.7446 \times 10^{-5}$ | | | | |

FFS⑤

| $C_4$ | $-4.5549 \times 10^{-2}$ | $C_6$ | $-3.5862 \times 10^{-2}$ | $C_8$ | $1.0022 \times 10^{-3}$ |
| $C_{10}$ | $-3.1292 \times 10^{-4}$ | $C_{11}$ | $-1.0085 \times 10^{-4}$ | $C_{13}$ | $-1.7098 \times 10^{-4}$ |
| $C_{15}$ | $-5.5848 \times 10^{-6}$ | | | | |

Displacement and tilt(1)

| X | 0.00 | Y | 0.00 | Z | 0.20 |
| α | 0.00 | β | 0.00 | γ | 0.00 |

Displacement and tilt(2)

| X | 0.00 | Y | -0.00 | Z | 2.37 |
| α | -56.36 | β | 0.00 | γ | 0.00 |

Displacement and tilt(3)

| X | 0.00 | Y | 2.66 | Z | 3.48 |
| α | -85.96 | β | 0.00 | γ | 0.00 |

Displacement and tilt(4)

| X | 0.00 | Y | 0.86 | Z | 4.53 |
| α | -54.89 | β | 0.00 | γ | 0.00 |

Displacement and tilt(5)

| X | 0.00 | Y | -1.17 | Z | 5.75 |
| α | -82.10 | β | 0.00 | γ | 0.00 |

Displacement and tilt(6)

| X | 0.00 | Y | 2.47 | Z | 9.70 |
| α | 0.00 | β | 0.00 | γ | 0.00 |

Displacement and tilt(7)

| X | 0.00 | Y | 2.47 | Z | 9.80 |
| α | 0.00 | β | 0.00 | γ | 0.00 |

Displacement and tilt(8)

| X | 0.00 | Y | 2.47 | Z | 10.35 |
| α | 0.00 | β | 0.00 | γ | 0.00 |

Displacement and tilt(9)

| X | 0.00 | Y | 2.47 | Z | 11.05 |
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ASS① | 2.00 | | 1.5254 | 55.8 |
| 2 | 5.32 | 2.32 | | | |
| 3 | ∞ (Stop) | | | | |
| 4 | FFS① | | (1) | 1.5254 | 55.8 |
| 5 | FFS② | | (2) | 1.5254 | 55.8 |
| 6 | FFS③ | | (3) | 1.5254 | 55.8 |
| 7 | FFS② | | (2) | | |
| 8 | FFS④ | | (4) | 1.5254 | 55.8 |
| 9 | FFS⑤ | | (5) | 1.5254 | 55.8 |
| 10 | FFS④ | | (4) | 1.5254 | 55.8 |
| 11 | ∞ | | (6) | | |
| 12 | ∞ | | (7) | 1.5163 | 64.1 |
| 13 | ∞ | | (8) | | |
| Image plane | ∞ | | (9) | | |

ASS①

| R | -0.19 | | |
| K | $-5.3042 \times 10^{12}$ | | |
| A | $3.2263 \times 10^{-4}$ | | |
| B | $9.4407 \times 10^{-6}$ | | |

-continued

FFS①

| | | | | | | |
|---|---|---|---|---|---|---|
| $C_4$ | $9.4601 \times 10^{-2}$ | $C_6$ | $9.4063 \times 10^{-2}$ | | | |

FFS②

| | | | | | | |
|---|---|---|---|---|---|---|
| $C_4$ | $7.0060 \times 10^{-3}$ | $C_6$ | $3.4313 \times 10^{-3}$ | $C_8$ | $4.4086 \times 10^{-4}$ |
| $C_{10}$ | $4.1181 \times 10^{-4}$ | $C_{11}$ | $3.8467 \times 10^{-4}$ | $C_{13}$ | $-8.7750 \times 10^{-6}$ |
| $C_{15}$ | $2.3939 \times 10^{-5}$ | | | | |

FFS③

| | | | | | | |
|---|---|---|---|---|---|---|
| $C_4$ | $-1.0899 \times 10^{-2}$ | $C_6$ | $-1.1224 \times 10^{-2}$ | $C_8$ | $2.4936 \times 10^{-3}$ |
| $C_{10}$ | $2.7277 \times 10^{-3}$ | $C_{11}$ | $1.4602 \times 10^{-5}$ | $C_{13}$ | $-3.1706 \times 10^{-4}$ |
| $C_{15}$ | $6.5358 \times 10^{-5}$ | | | | |

FFS④

| | | | | | | |
|---|---|---|---|---|---|---|
| $C_4$ | $-3.6243 \times 10^{-2}$ | $C_6$ | $-1.6563 \times 10^{-2}$ | $C_8$ | $-2.2006 \times 10^{-3}$ |
| $C_{10}$ | $-1.5026 \times 10^{-3}$ | $C_{11}$ | $2.4606 \times 10^{-4}$ | $C_{13}$ | $-9.1150 \times 10^{-5}$ |
| $C_{15}$ | $-6.4463 \times 10^{-5}$ | | | | |

FFS⑤

| | | | | | | |
|---|---|---|---|---|---|---|
| $C_4$ | $-5.0002 \times 10^{-2}$ | $C_6$ | $-4.1129 \times 10^{-2}$ | $C_8$ | $3.4936 \times 10^{-4}$ |
| $C_{10}$ | $1.8044 \times 10^{-4}$ | $C_{11}$ | $-1.1817 \times 10^{-4}$ | $C_{13}$ | $-2.3358 \times 10^{-4}$ |
| $C_{15}$ | $-4.8676 \times 10^{-5}$ | | | | |

Displacement and tilt(1)

| X | 0.00 | Y | 0.00 | Z | 0.20 |
|---|---|---|---|---|---|
| α | 0.00 | β | 0.00 | γ | 0.00 |

Displacement and tilt(2)

| X | 0.00 | Y | −0.00 | Z | 2.31 |
|---|---|---|---|---|---|
| α | −57.89 | β | 0.00 | γ | 0.00 |

Displacement and tilt(3)

| X | 0.00 | Y | 2.75 | Z | 3.63 |
|---|---|---|---|---|---|
| α | −85.86 | β | 0.00 | γ | 0.00 |

Displacement and tilt(4)

| X | 0.00 | Y | 2.92 | Z | 7.96 |
|---|---|---|---|---|---|
| α | −55.39 | β | 0.00 | γ | 0.00 |

Displacement and tilt(5)

| X | 0.00 | Y | −1.28 | Z | 6.37 |
|---|---|---|---|---|---|
| α | −83.38 | β | 0.00 | γ | 0.00 |

Displacement and tilt(6)

| X | 0.00 | Y | 2.92 | Z | 11.20 |
|---|---|---|---|---|---|
| α | 0.00 | β | 0.00 | γ | 0.00 |

Displacement and tilt(7)

| X | 0.00 | Y | 2.92 | Z | 11.30 |
|---|---|---|---|---|---|
| α | 0.00 | β | 0.00 | γ | 0.00 |

Displacement and tilt(8)

| X | 0.00 | Y | 2.92 | Z | 11.85 |
|---|---|---|---|---|---|
| α | 0.00 | β | 0.00 | γ | 0.00 |

Displacement and tilt(9)

| X | 0.00 | Y | 2.92 | Z | 12.55 |
|---|---|---|---|---|---|
| α | 0.00 | β | 0.00 | γ | 0.00 |

Figure 3:
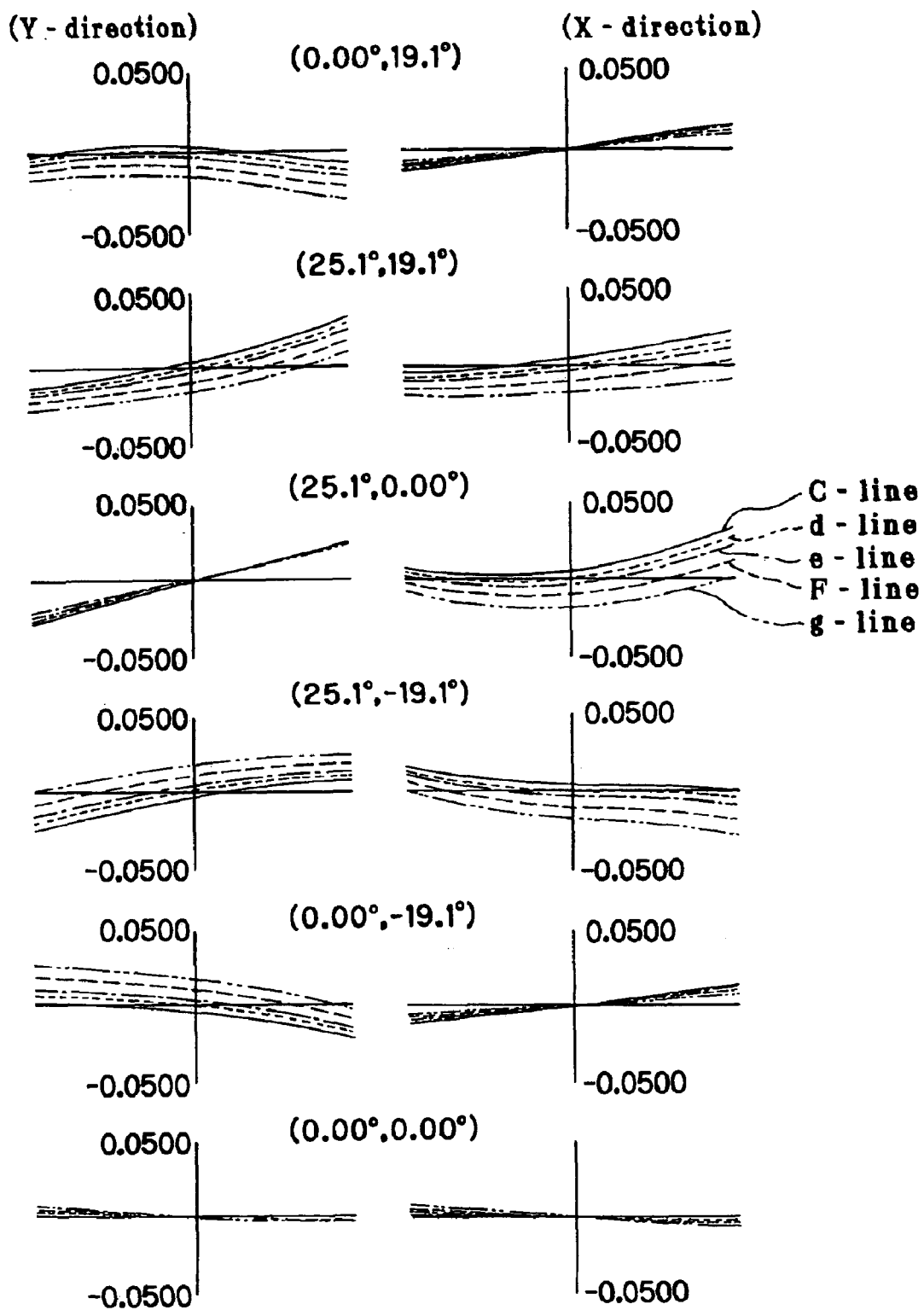
FIG. 3 is an aberrational diagram showing lateral aberrations in the image-forming optical system according to Example 1.

FIG. 3 is an aberrational diagram showing lateral aberrations in the above-described Example 1. In the aberrational diagram, the numerals in the parentheses denote [horizontal (X-direction) field angle, vertical (Y-direction) field angle], and lateral aberrations at the field angles are shown.

The values concerning the conditions (1) to (20) in the above-described Examples 1 and 2 are as follows.

| | Example 1 | Example 2 |
|---|---|---|
| Fx | 6.68 mm | 4.72 mm |
| Fy | 6.50 mm | 4.62 mm |

| | Example 1 | Example 2 |
|---|---|---|
| P1x | −0.027 | 0.034 |
| P1y | −0.024 | 0.002 |
| P2x | 0.202 | 0.316 |
| P2y | 0.190 | 0.252 |
| θ1 | 5.7° | 5.4° |
| θ2 | 6.3° | 5.5° |
| P1x/Px | −0.181 | 0.159 |
| P1y/Py | −0.154 | 0.010 |
| P2x/Px | 1.348 | 1.493 |
| P2y/Py | 1.234 | 1.163 |

Incidentally, the above-described image-forming optical system according to the present invention can be used in various photographic apparatus that use an electronic image pickup device, e.g. a CCD or a CMOS sensor. Embodiments in which the present invention is applied to such apparatus will be described below.

Figure 4:
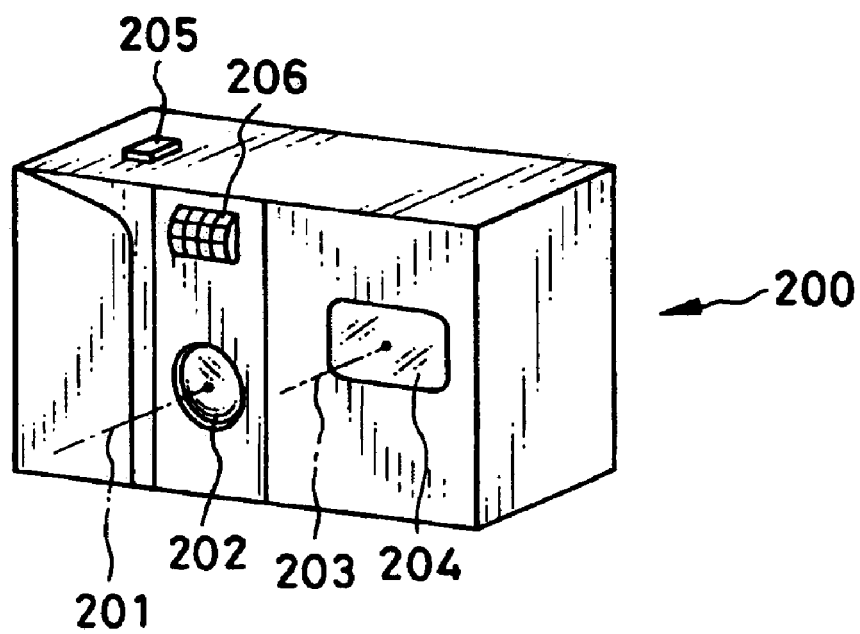
FIG. 4 is a perspective view showing the external appearance of an electronic camera incorporating an image-forming optical system according to the present invention as an objective optical system, as viewed from the front side thereof.
Figure 5:
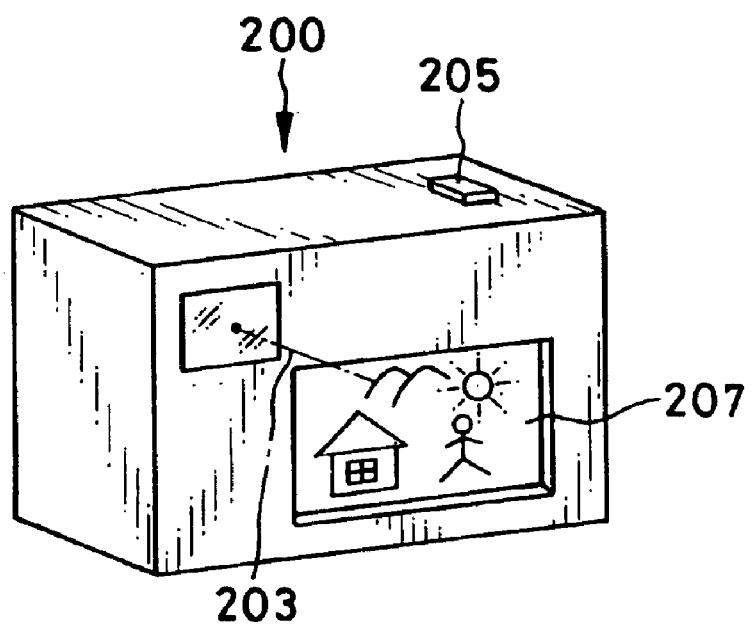
FIG. 5 is a perspective view of the electronic camera incorporating an image-forming optical system according to the present invention as an objective optical system, as viewed from the rear side thereof.
Figure 6:
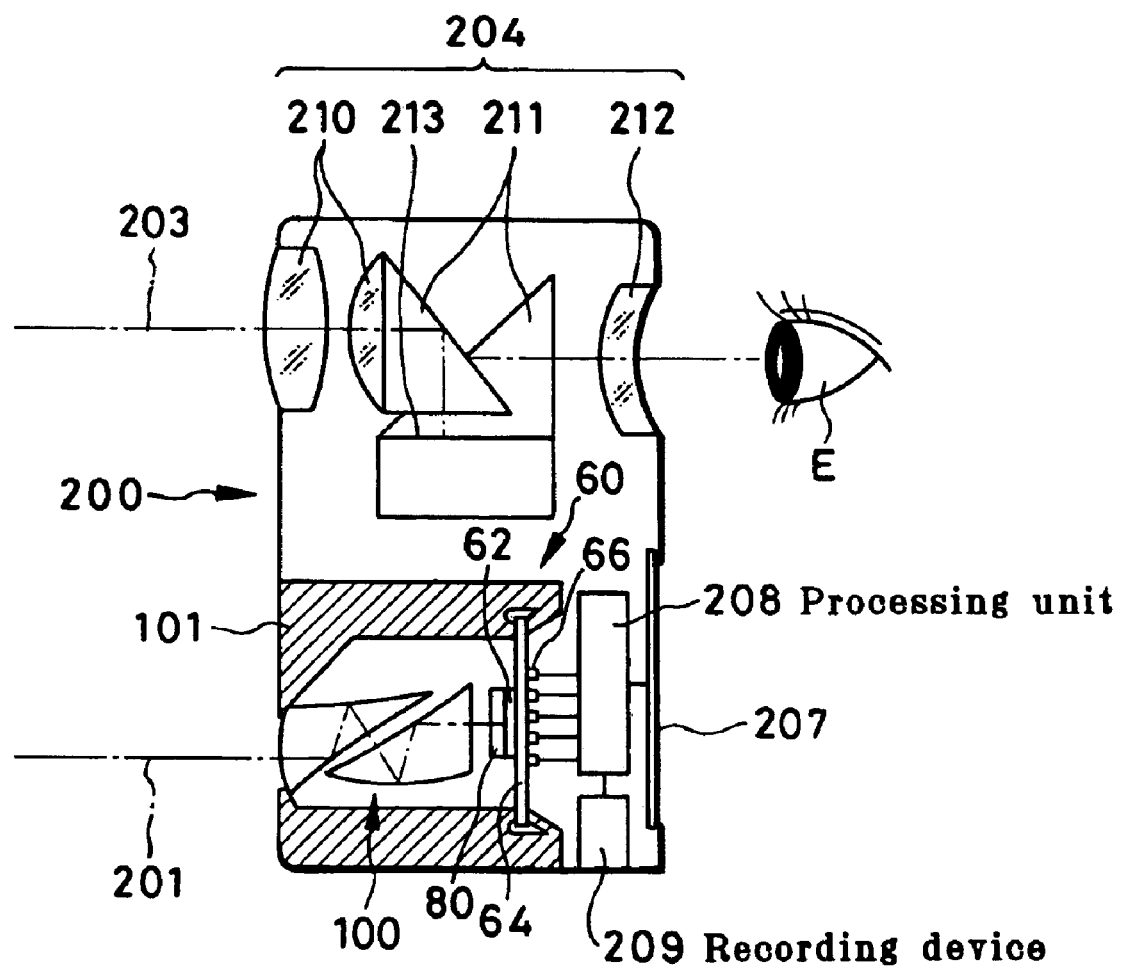
FIG. 6 is a sectional view showing the arrangement of the electronic camera incorporating an image-forming optical system according to the present invention as an objective optical system.

FIGS. 4 to 6 are conceptual views showing an arrangement in which an image-forming optical system according to the present invention is incorporated into an objective optical system of an electronic camera. FIG. 4 is a perspective view showing the external appearance of an electronic camera 200 as viewed from the front side thereof. FIG. 5 is a perspective view of the electronic camera 200 as viewed from the rear side thereof. FIG. 6 is a sectional view showing the arrangement of the electronic camera 200.

In the illustrated example, the electronic camera 200 includes a photographic optical system 202 having an optical path 201 for photography, a finder optical system 204 having an optical path 203 for the finder, a shutter 205, a flash 206, a liquid crystal display monitor 207, etc. When the shutter 205, which is placed on the top of the camera 200, is depressed, photography is performed through an image-forming optical system according to the present invention placed as an objective optical system 100 for photography. An object image produced by the objective optical system 100 for photography is formed on an image pickup chip 62, e.g. a CCD, through an IR (infrared) cutoff filter 80.

In this case, the image pickup chip 62 has additionally the IR cutoff filter 80 integrally stuck thereon to form an image pickup unit 60. Thus, the image pickup unit 60 can be mounted in a one-touch simple operation by fitting it to the rear end of a lens frame 101 of the objective optical system 100. Accordingly, it is unnecessary to perform centering of the objective optical system 100 and the image pickup chip 62 and adjustment of surface separation. Therefore, the assembly is easy. Thus, the camera apparatus is arranged to provide commercial merits, such as an improvement in productivity of the camera apparatus and realization of a cost reduction. The distal end of the lens frame 101 functions as a stop of the objective optical system 100.

The object image received by the image pickup chip 62 is processed in a processing unit 208, which is electrically connected to terminals 66, and displayed as an electronic image on the liquid crystal display monitor 207, which is provided on the rear of the camera 200. The processing unit 208 also controls a recording device 209 for recording the object image received by the image pickup chip 62 in the form of electronic information. The recording device 209 may be a memory provided in the processing unit 208. Alternatively, as shown in the figure, the recording device 209 may be a device electrically connected to the processing unit 208 to electronically write information onto a magnetic recording medium, e.g. a floppy disk or a smart medium.

Furthermore, the finder optical system 204, which has the optical path 203 for the finder, includes an objective optical system 210 for the finder, and a Porro prism 211 for erecting an object image formed by the objective optical system 210 for the finder. The finder optical system 204 further includes an ocular lens 212 for leading the object image to an observer's eyeball E. The Porro prism 211 is split into a front portion and a rear portion. A plane where the object image is formed is present between the front and rear portions. A view frame 213 is placed in the plane. The Porro prism 211 has four reflecting surfaces to erect the object image formed by the objective optical system 210 for the finder.

In the camera 200, the finder optical system 204 may be omitted to reduce the number of parts and to form a compact and low-cost camera. In this case, the observer takes a photograph while viewing the liquid crystal display monitor 207.

Figure 7:
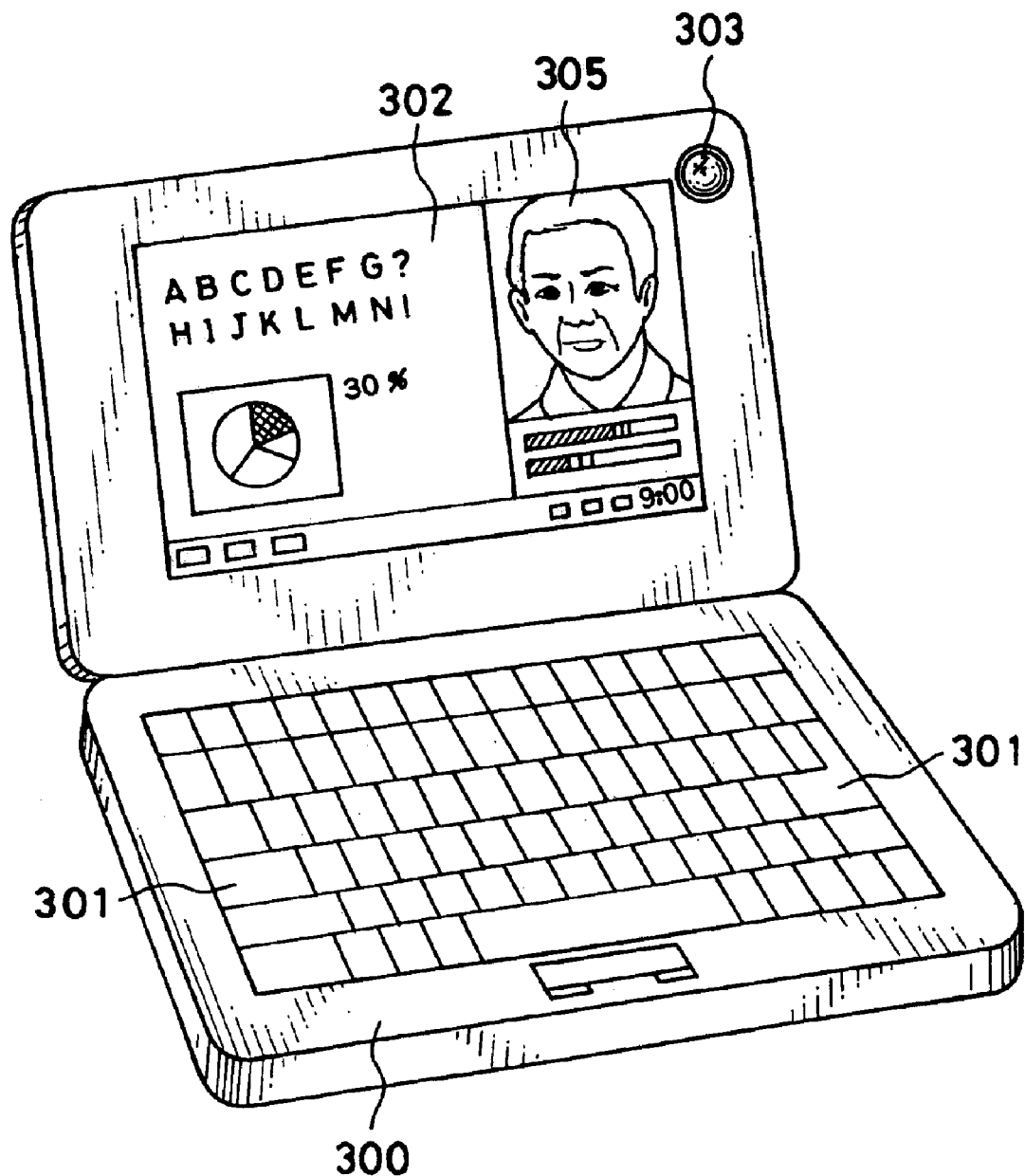
FIG. 7 is a perspective view showing a personal computer incorporating an image-forming optical system according to the present invention as an objective optical system, as viewed from the front side thereof, in a state where a cover is open.
Figure 8:
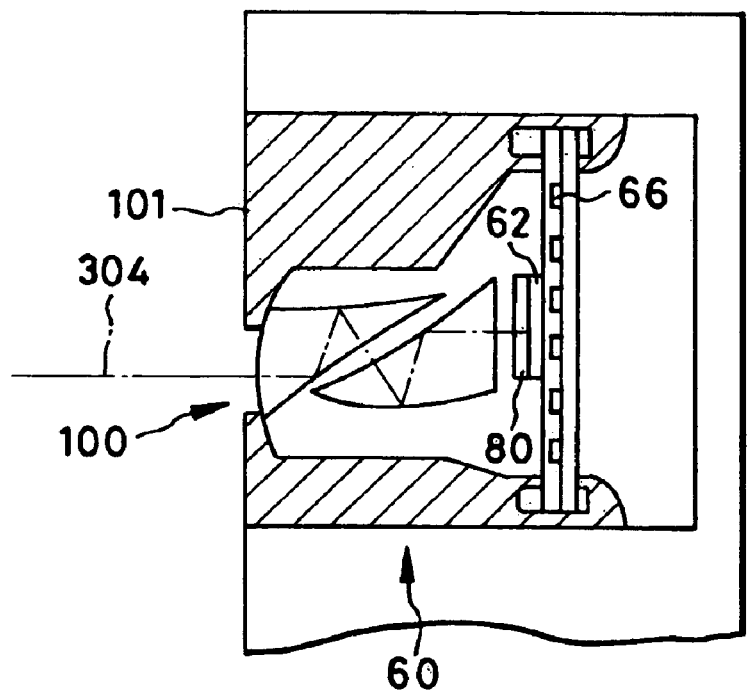
FIG. 8 is a sectional view of a photographic optical system of the personal computer.
Figure 9:
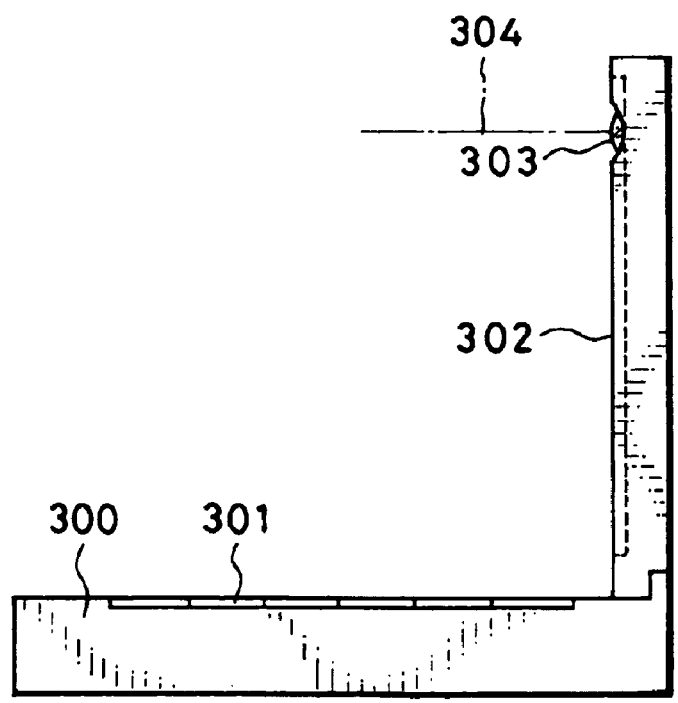
FIG. 9 is a side view of the personal computer in the state shown in FIG. 8.

FIGS. 7 to 9 are conceptual views showing an arrangement in which an image-forming optical system according to the present invention is incorporated in a personal computer as an example of information processing apparatus.

FIG. 7 is a perspective view of a personal computer 300 as seen from the front side thereof in a state where a cover thereof is open. FIG. 8 is a sectional view of a photographic optical system 303 of the personal computer 300, and FIG. 9 is a side view of the personal computer 300 shown in FIG. 7. As shown in FIGS. 7 to 9, the personal computer 300 has a keyboard 301 used by an operator to input information externally, and information processing and recording devices (not shown). The personal computer 300 further has a monitor 302 for displaying information for the operator, and a photographic optical system 303 for taking a photograph of the operator or an image of a surrounding object. In this case, the monitor 302 may be a transmissive liquid crystal display, which is illuminated from the rear side by a backlight (not shown), or a reflective liquid crystal display, which displays information by reflecting light applied from the front side thereof. The monitor 302 may also be a CRT display or the like. Although the photographic optical system 303 is incorporated in a portion at the top right corner of the monitor 302, the position of the photographic optical system 303 is not necessarily limited to the illustrated position. The photographic optical system 303 may be provided at any position around the monitor 302 or around the keyboard 301.

The photographic optical system 303 has, in a photographic optical path 304, an objective optical system 100 comprising an image-forming optical system according to the present invention, and an image pickup chip 62 for receiving an image. These constituent elements are incorporated in the personal computer 300.

In this case, the image pickup chip 62 has additionally an IR cutoff filter 80 integrally stuck thereon to form an image pickup unit 60. Thus, the image pickup unit 60 can be mounted in a one-touch simple operation by fitting it to the rear end of a lens frame 101 of the objective optical system 100. Accordingly, it is unnecessary to perform centering of the objective optical system 100 and the image pickup chip 62 and adjustment of surface separation. Therefore, the assembly is easy. The distal end of the lens frame 101 functions as a stop of the objective optical system 100.

An object image received by the image pickup chip 62 is input to a processing device of the personal computer 300 through terminals 66 and displayed on the monitor 302 in the form of an electronic image. FIG. 7 shows a photographed image 305 of the operator as an example of the electronic image. The image 305 can also be transferred so as to be displayed on a personal computer of the person on the other end of a communication line from a remote place through the processing device via the internet or telephone lines.

Figure 10:
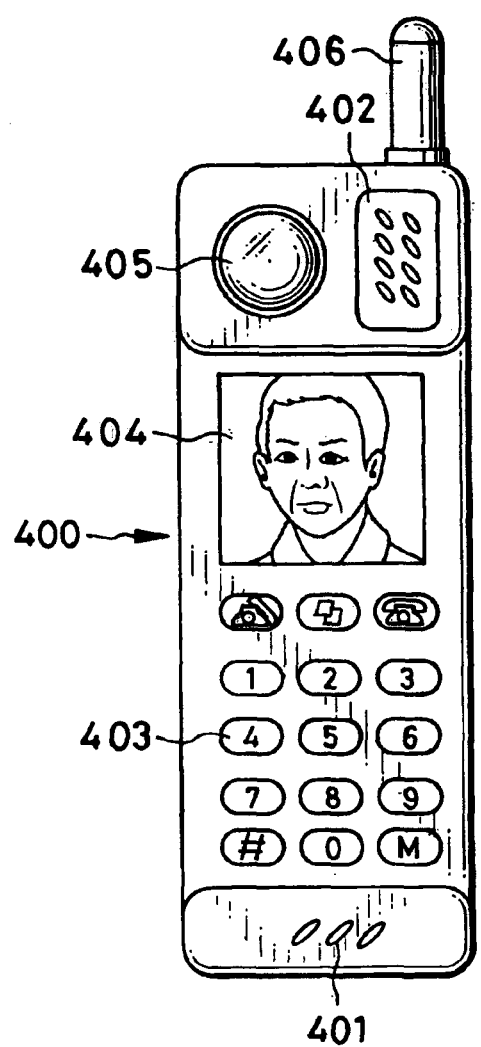
FIG. 10 is a front view and side view of a portable telephone incorporating an image-forming optical system according to the present invention as an objective optical system, which also shows a sectional view of a photographic optical system of the portable telephone.
Figure 10:
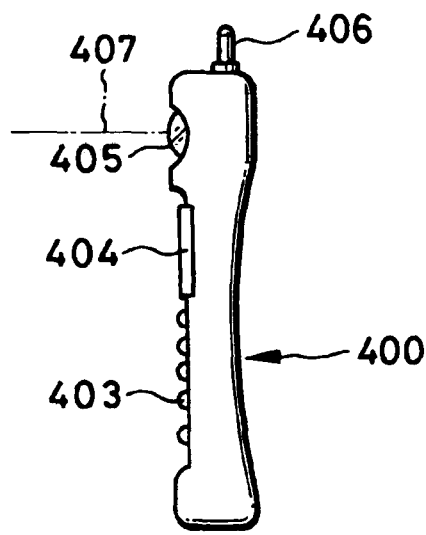
Figure 10:
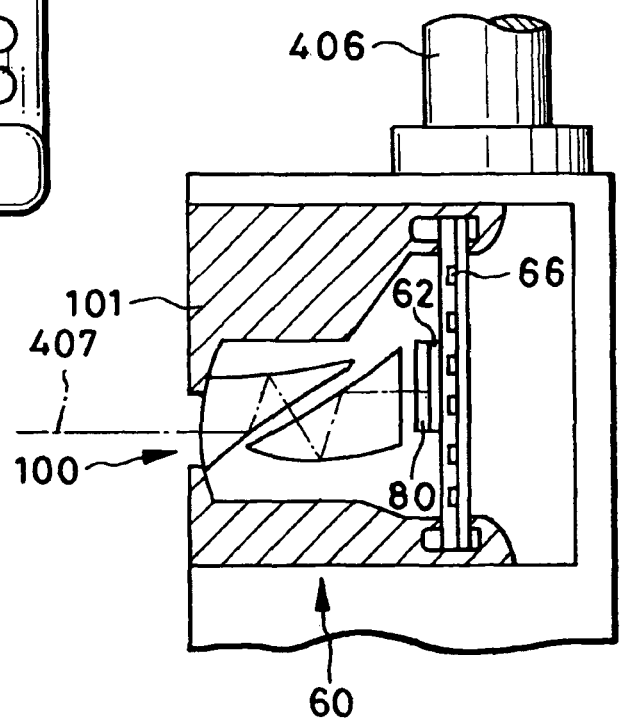

FIG. 10 show a telephone as another example of information processing apparatus, particularly an example in which an image-forming optical system according to the present invention is incorporated in a portable telephone, which is handy to carry.

Part (a) of FIG. 10 is a front view of a portable telephone 400, and part (b) of FIG. 10 is a side view thereof. Part (c) of FIG. 10 is a sectional view of a photographic optical system 405. As shown in parts (a) to (c) of FIG. 10, the portable telephone 400 has a microphone unit 401 for inputting the voice of the operator as information and a speaker unit 402 for outputting the voice of the person on the other end of a communication line. The portable telephone 400 further has input keys 403 used by the operator to input information, and a monitor 404 for displaying information, e.g. a photographed image of the operator or the person on the other end of the line and a telephone number. In addition, the portable telephone 400 has a photographic optical system 405, an antenna 406 for transmitting and receiving electric waves for telephonic communication, and a processing unit (not shown) for processing image information, communication information, input signals, etc. The monitor 404 is a liquid crystal display device. The layout of the constituent elements shown in the figures is not necessarily limited to the illustrated layout. The photographic optical system 405 has an objective optical system 100 comprising an image-forming optical system according to the present invention, and an image pickup chip 62 for receiving an image. The objective optical system 100 and the image pickup chip 62 are placed in a photographic optical path 407 and incorporated in the portable telephone 400.

In this case, the image pickup chip 62 has additionally an IR cutoff filter 80 integrally stuck thereon to form an image pickup unit 60. Thus, the image pickup unit 60 can be mounted in a one-touch simple operation by fitting it to the rear end of a lens frame 101 of the objective optical system 100. Accordingly, it is unnecessary to perform centering of the objective optical system 100 and the image pickup chip 62 and adjustment of surface separation. Therefore, the assembly is easy. The distal end of the lens frame 101 functions as a stop of the objective optical system 100.

An object image received by the image pickup chip 62 is input to the processing unit (not shown) through terminals 66 and displayed in the form of an electronic image on the monitor 404 or on the monitor of a person on the other end of a communication line. Alternatively, the object image is displayed on both the monitors. The processing unit further includes a signal processing function to covert information concerning the object image received by the image pickup chip 62 into a transmittable signal when the image is to be transmitted to the person on the other end of the communication line.

Figure 11:
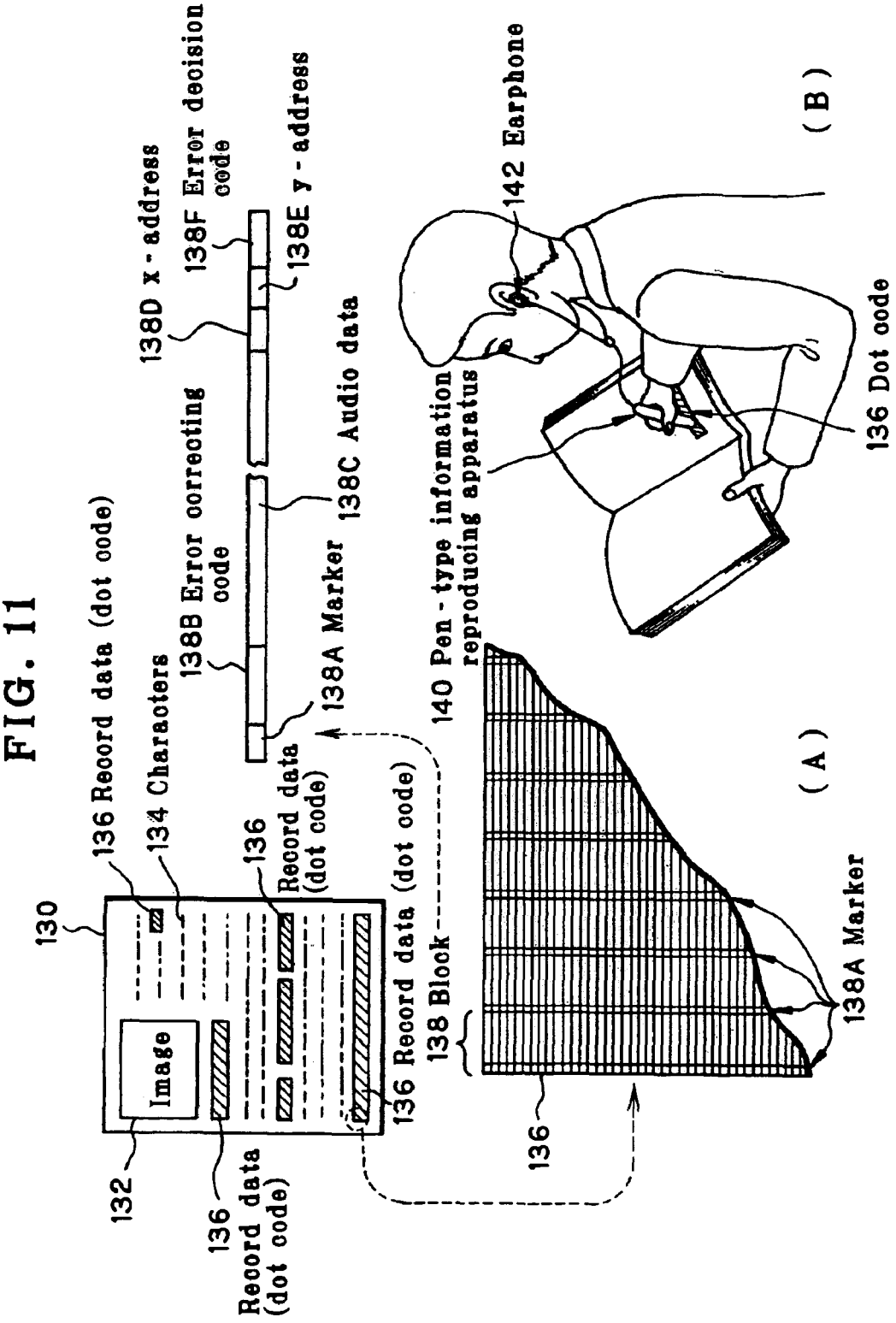
FIG. 11 is a diagram illustrating a form of information to be reproduced by an information reproducing system to which an image-forming optical system according to the present invention is applied.
Figure 12:
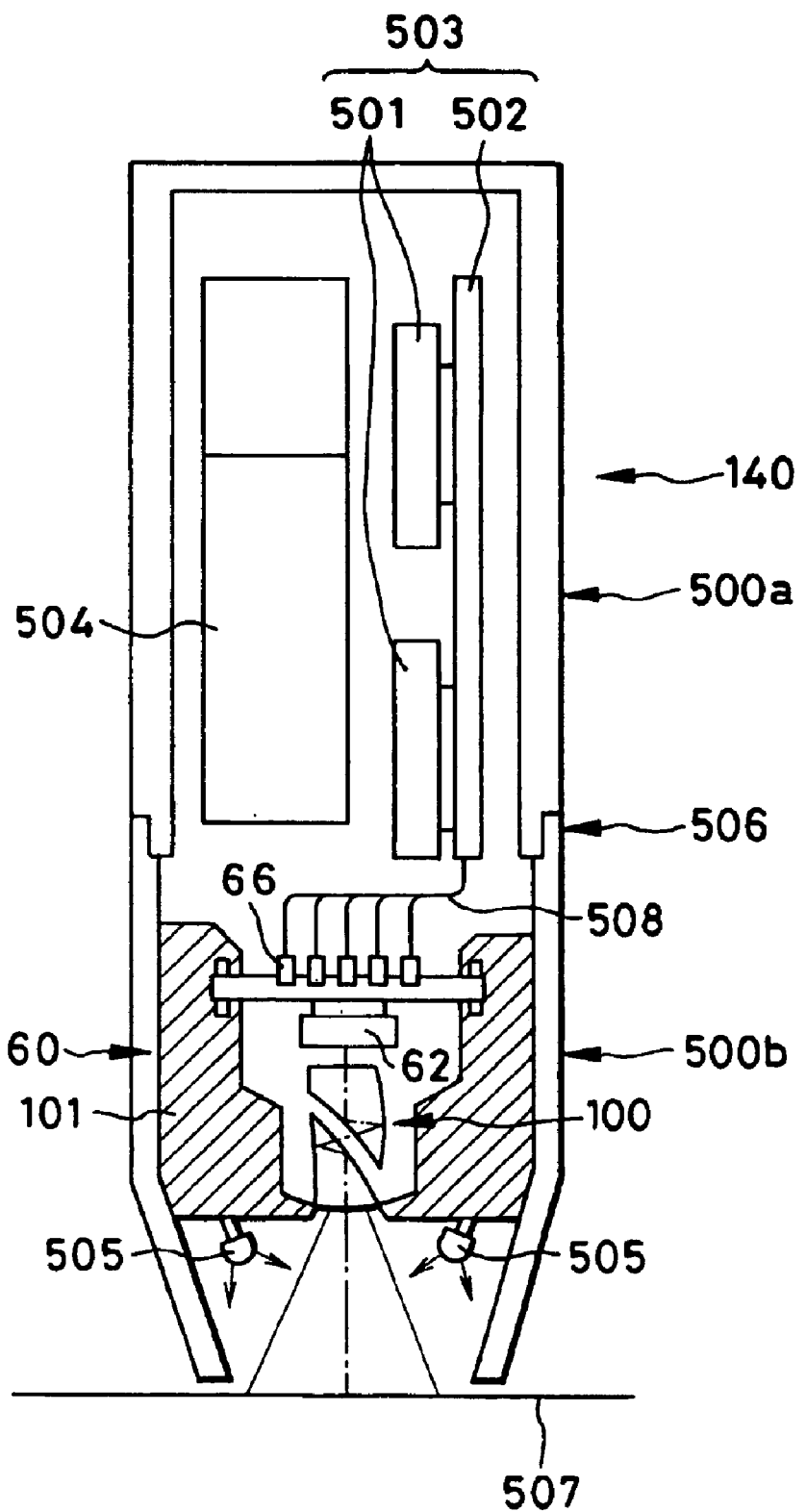
FIG. 12 is a sectional view showing the internal arrangement of a pen-type information reproducing apparatus using an image-forming optical system according to the present invention.
Figure 13:
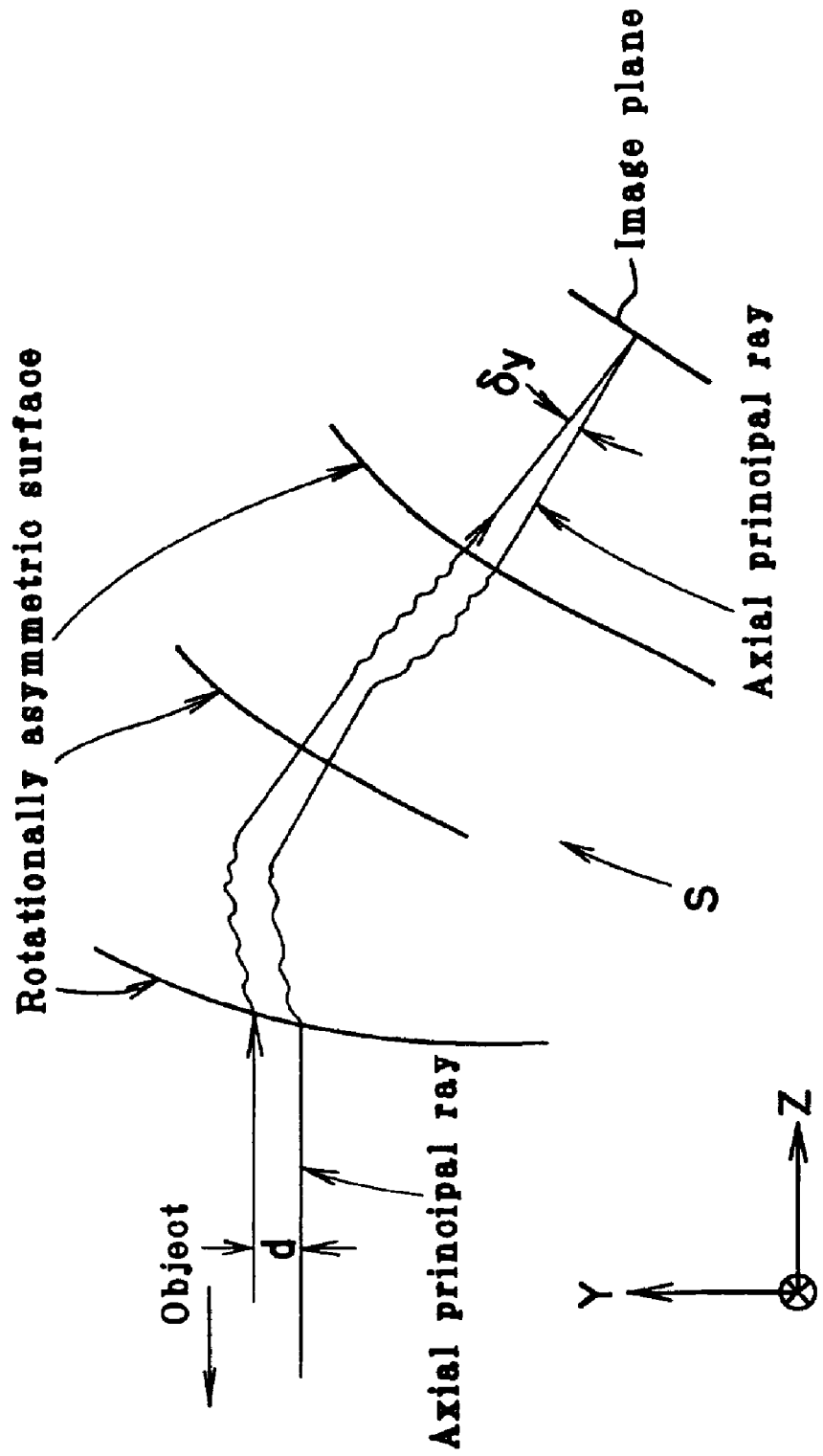
FIG. 13 is a diagram for describing the definition of the power and focal length of the image-forming optical system according to the present invention.

FIGS. 11 and 12 show an information reproducing system using an image-forming optical system according to the present invention. A more detailed description of such an information reproducing system is disclosed in JP(A) 6-231466; therefore, a detailed description thereof is herein omitted. The following is a description of an example relating to audio information, e.g. speech and music, among multimedia information. An audio information recording apparatus for recording audio information, e.g. speech and music, on a sheet of paper as optically readable digital signals is shown in JP(A) 6-231466.

By this apparatus, information is recorded on a sheet of paper 130 in a format as shown for example in part (A) of FIG. 11. More specifically, sound data converted into digital signals, together with an image 132 and characters 134, is printed as record data 136. The record data 136 consists essentially of a plurality of blocks 138. Each block 138 includes a marker 138A, an error correcting code 138B, audio data 138C, x-address data 138D, y-address data 138E, and an error decision code 138F.

It should be noted that the marker 138A also functions as a synchronizing signal, and it uses a pattern that does not usually appear in recording modulation as in DAT. The error correcting code 138B is used for error correction of the audio data 138C. The audio data 138C corresponds to microphone or audio signals. The x-address data 138D and y-address data 138E are data that indicates the position of the block 138 concerned. The error decision code 138F is used for error decision concerning the x- and y-addresses.

The record data 136 prepared in the format described above is printed and thus recorded by a printer system or a photoengraving system for printing in such a manner that data "1" is represented as a black dot, and data "0" as no black dot, for example, as in the case of a bar code. Such record data will be hereinafter referred to as "dot code".

Part (B) of FIG. 11 shows a way in which sound data recorded on a sheet of paper 130 such as that shown in part (A) of FIG. 11 is read with a pen-type information reproducing apparatus (information reproducing system) 140. A dot code 136 is detected and converted into sound by tracing it with the pen-type information reproducing apparatus 140. Thus, it is possible to listen to the sound by using a sound output device 142, e.g. an earphone.

FIG. 12 is a sectional view showing the internal structure of the pen-type information reproducing apparatus 140. The pen-type information reproducing apparatus 140 comprises a rear portion 500a and a front portion 500b. The rear portion 500a has a processing unit 503 including electric circuit components 501 and a board 502 for supporting the electric circuit components 501. The rear portion 500a further has a battery 504. The front portion 500b has an image pickup unit 60 and a light source 505, e.g. LEDs.

The front and rear portions 500b and 500a are joined together at a joint portion 506. The arrangement of the image pickup unit 60 is the same as that shown in FIG. 6, etc. Therefore, a description thereof is omitted.

In the pen-type information reproducing apparatus 140, an information recording medium 507 as a subject is illuminated with illuminating light (illustrated by the arrows in the figure) from the light source 505. The objective optical system 100 forms a subject image on the image pickup chip 62. The image is converted into an electric signal and input to the processing unit 503, which is electrically connected to the terminals 66 through connecting lines 508. Thus, as shown in FIG. 11, the operator can listen to the sound with an earphone or a speaker.

The reason why the front and rear portions 500b and 500a of the pen-type information reproducing apparatus 140 are separable at the joint portion 506 is to allow the image pickup unit 60 to be readily incorporated into the apparatus 140 and to permit easy replacement of parts.

The information reproducing apparatus is not necessarily limited to the pen type but may be formed in various shapes.

As will be clear from the foregoing description, it is possible according to the present invention to provide a high-performance and low-cost image-forming optical system using a reduced number of constituent optical elements. It is also possible to provide a high-performance image-forming optical system that is made compact and thin by folding an optical path using reflecting surfaces arranged to minimize the number of reflections.

What we claim is:

1. An image-forming optical system for forming an image of an object, said image-forming optical system comprising:

a stop;

a first prism; and a second prism;

said first prism and said second prism being provided between said stop and an image plane;

said first prism including, in order from an object side thereof:

a first prism entrance surface through which a light beam passing through said stop enters said first prism;

a first prism first reflecting surface that reflects the light beam entering said first prism;

a first prism second reflecting surface that reflects the light beam reflected by said first prism first reflecting surface; and a first prism exit surface through which the light beam reflected by said first prism second reflecting surface exits from said first prism;

wherein said first prism first reflecting surface and said first prism exit surface are an identical surface, and the light beam entering through said first prism entrance surface is incident on said first prism exit surface at an angle exceeding a total reflection critical angle, thereby allowing said first prism exit surface to produce a reflecting action so as to function as said first prism first reflecting surface;

said second prism including:

a second prism entrance surface through which the light beam exiting from said first prism exit surface enters said second prism;

a second prism first reflecting surface that reflects the light beam entering said second prism;

a second prism second reflecting surface that reflects the light beam reflected by said second prism first reflecting surface; and a second prism exit surface through which the light beam reflected by said second prism second reflecting surface exits from said second prism;

wherein said second prism second reflecting surface and said second prism entrance surface are an identical surface, and the light beam reflected from said second prism first reflecting surface is incident on said second prism entrance surface at an angle exceeding a total reflection critical angle, thereby allowing said second prism entrance surface to produce a reflecting action so as to function as said second prism second reflecting surface, and wherein said first prism and said second prism satisfy the following conditions (1) and (2):

$$P1x < P2x \quad (1)$$

$$P1y < P2y \quad (2)$$

where when a decentration direction of said imageforming optical system is a Y-axis direction, and a plane parallel to a light ray connecting a center of said stop and a center of said image plane is a YZ-plane, and further a direction perpendicularly intersecting the YZ-plane is an X-axis direction, $P1x$ and $P1y$ are powers in the X-axis direction and Y-axis direction, respectively, of said first prism, and $P2x$ and $P2y$ are powers in the X-axis direction and Y-axis direction, respectively, of said second prism, and further $Px$ and $Py$ are powers in the X-axis direction and Y-axis direction, respectively, of said image-forming optical system.

2. An image-forming optical system for forming an image of an object, said image-forming optical system comprising:

a stop;

a first prism; and a second prism;

said first prism and said second prism being provided between said stop and an image plane;

said first prism including, in order from an object side thereof:

a first prism entrance surface through which a light beam passing through said stop enters said first prism;

a first prism first reflecting surface that reflects the light beam entering said first prism;

a first prism second reflecting surface that reflects the light beam reflected by said first prism first reflecting surface; and a first prism exit surface through which the light beam reflected by said first prism second reflecting surface exits from said first prism;

wherein said first prism first reflecting surface and said first prism exit surface are an identical surface, and the light beam entering through said first prism entrance surface is incident on said first prism exit surface at an angle exceeding a total reflection critical angle, thereby allowing said first prism exit surface to produce a reflecting action so as to function as said first prism first reflecting surface;

said second prism including:

a second prism entrance surface through which the light beam exiting from said first prism exit surface enters said second prism;

a second prism first reflecting surface that reflects the light beam entering said second prism;

a second prism second reflecting surface that reflects the light beam reflected by said second prism first reflecting surface; and a second prism exit surface through which the light beam reflected by said second prism second reflecting surface exits from said second prism;

wherein said second prism second reflecting surface and said second prism entrance surface are an identical surface, and the light beam reflected from said second prism first reflecting surface is incident on said second prism entrance surface at an angle exceeding a total reflection critical angle, thereby allowing said second prism entrance surface to produce a reflecting action so as to function as said second prism second reflecting surface, and wherein said first prism satisfies the following conditions (9) and (10):

$$-1.0 < P1x/Px < 1.0 \quad (9)$$

$$-1.0 < P1y/Py < 1.0 \quad (10)$$

where when a decentration direction of said image-forming optical system is a Y-axis direction, and a plane parallel to a light ray connecting a center of said stop and a center of said image plane is a YZ-plane, and further a direction perpendicularly intersecting the YZ-plane is an X-axis direction, $P1x$ and $P1y$ are powers in the X-axis direction and Y-axis direction, respectively, of said first prism, and $P2x$ and $P2y$ are powers in the X-axis direction and Y-axis direction, respectively, of said second prism, and further Px and Py are powers in the X-axis direction and Y-axis direction, respectively, of said image-forming optical system.

3. An image-forming optical system for forming an image of an object, said image-forming optical system comprising:

a stop;

a first prism; and a second prism;

said first prism and said second prism being provided between said stop and an image plane;

said first prism including, in order from an object side thereof:

a first prism entrance surface through which a light beam passing through said stop enters said first prism;

a first prism first reflecting surface that reflects the light beam entering said first prism;

a first prism second reflecting surface that reflects the light beam reflected by said first prism first reflecting surface; and a first prism exit surface through which the light beam reflected by said first prism second reflecting surface exits from said first prism;

wherein said first prism first reflecting surface and said first prism exit surface are an identical surface, and the light beam entering through said first prism entrance surface is incident on said first prism exit surface at an angle exceeding a total reflection critical angle, thereby allowing said first prism exit surface to produce a reflecting action so as to function as said first prism first reflecting surface;

said second prism including:

a second prism entrance surface through which the light beam exiting from said first prism exit surface enters said second prism;

a second prism first reflecting surface that reflects the light beam entering said second prism;

a second prism second reflecting surface that reflects the light beam reflected by said second prism first reflecting surface; and a second prism exit surface through which the light beam reflected by said second prism second reflecting surface exits from said second prism;

wherein said second prism second reflecting surface and said second prism entrance surface are an identical surface, and the light beam reflected from said second prism first reflecting surface is incident on said second prism entrance surface at an angle exceeding a total reflection critical angle, thereby allowing said second prism entrance surface to produce a reflecting action so as to function as said second prism second reflecting surface, and wherein said second prism satisfies the following conditions (11) and (12):

$$0 < P2x/Px < 3.0 \quad (11)$$

$$0 < P2y/Py < 3.0 \quad (12)$$

where when a decentration direction of said image-forming optical system is a Y-axis direction, and a plane parallel to a light ray connecting a center of said stop and a center of said image plane is a YZ-plane, and further a direction perpendicularly intersecting the YZ-plane is an X-axis direction, $P1x$ and $P1y$ are powers in the X-axis direction and Y-axis direction, respectively, of said first prism, and $P2x$ and $P2y$ are powers in the X-axis direction and Y-axis direction, respectively, of said second prism, and further Px and Py are powers in the X-axis direction and Y-axis direction, respectively, of said image-forming optical system.

4. An image-forming optical system for forming an image of an object, said image-forming optical system comprising:
a stop;
a first prism; and
a second prism;
said first prism and said second prism being provided between said stop and an image plane;
said first prism including, in order from an object side thereof:
a first prism entrance surface through which a light beam passing through said stop enters said first prism;
a first prism first reflecting surface that reflects the light beam entering said first prism;
a first prism second reflecting surface that reflects the light beam reflected by said first prism first reflecting surface; and
a first prism exit surface through which the light beam reflected by said first prism second reflecting surface exits from said first prism;
wherein said first prism first reflecting surface and said first prism exit surface are an identical surface, and the light beam entering through said first prism entrance surface is incident on said first prism exit surface at an angle exceeding a total reflection critical angle, thereby allowing said first prism exit surface to produce a reflecting action so as to function as said first prism first reflecting surface;
said second prism including:
a second prism entrance surface through which the light beam exiting from said first prism exit surface enters said second prism;
a second prism first reflecting surface that reflects the light beam entering said second prism;
a second prism second reflecting surface that reflects the light beam reflected by said second prism first reflecting surface; and
a second prism exit surface through which the light beam reflected by said second prism second reflecting surface exits from said second prism;
wherein said second prism second reflecting surface and said second prism entrance surface are an identical surface, and the light beam reflected from said second prism first reflecting surface is incident on said second prism entrance surface at an angle exceeding a total reflection critical angle, thereby allowing said second prism entrance surface to produce a reflecting action so as to function as said second prism second reflecting surface
wherein said first prism and said second prism satisfy the following conditions (3) and (4):

$$0 \leq \theta 1 \leq 25 \quad (3)$$

$$0 \leq \theta 2 \leq 25 \quad (3)$$

where when a light ray connecting a center of said stop and a center of said image plane is defined as an optical axis, θ1 is an angle formed between the optical axis and a line normal to the exit surface of said first prism at a point where the optical axis exits from said first prism, and θ2 is an angle formed between the optical axis and a line normal to the entrance surface of said second prism at a point where the optical axis enters said second prism.

5. An image-forming optical system for forming an image of an object, said image-forming optical system comprising:
a stop;
a first prism; and
a second prism;
said first prism and said second prism being provided between said stop and an image plane;
said first prism including, in order from an object side thereof:
a first prism entrance surface through which a light beam passing through said stop enters said first prism;
a first prism first reflecting surface that reflects the light beam entering said first prism;
a first prism second reflecting surface that reflects the light beam reflected by said first prism first reflecting surface; and
a first prism exit surface through which the light beam reflected by said first prism second reflecting surface exits from said first prism;
wherein said first prism first reflecting surface and said first prism exit surface are an identical surface, and the light beam entering through said first prism entrance surface is incident on said first prism exit surface at an angle exceeding a total reflection critical angle, thereby allowing said first prism exit surface to produce a reflecting action so as to function as said first prism first reflecting surface;
said second prism including:
a second prism entrance surface through which the light beam exiting from said first prism exit surface enters said second prism;
a second prism first reflecting surface that reflects the light beam entering said second prism;
a second prism second reflecting surface that reflects the light beam reflected by said second prism first reflecting surface; and
a second prism exit surface through which the light beam reflected by said second prism second reflecting surface exits from said second prism;
wherein said second prism second reflecting surface and said second prism entrance surface are an identical surface, and the light beam reflected from said second prism first reflecting surface is incident on said second prism entrance surface at an angle exceeding a total reflection critical angle, thereby allowing said second prism entrance surface to produce a reflecting action so as to function as said second prism second reflecting surface
wherein when a light ray connecting a center of said stop and a center of said image plane is defined as an optical axis, a configuration of said first prism entrance surface in a plane containing the optical axis folded by passing through said first prism and said second prism from said stop has a convex surface directed toward the object side to give a positive power to the light beam, and said second prism exit surface has an approximately flat surface configuration.

6. An information processing apparatus comprising:
said image-forming optical system according to any one of claims 1, 3, 4 and an electronic image pickup device placed at a position where it receives an object image formed by said image-forming optical system;
a signal processor, said signal processor being constructed to process an electronic signal obtained through photoelectric conversion by said electronic image pickup device;

an input unit used by an operator to input a desired information signal to said signal processor;

a display device for displaying an output from said signal processor; and a recording medium for recording the output from said signal processor;

wherein said signal processor is arranged to display the object image received with said electronic image pickup device on said display device.

7. An electronic camera apparatus comprising:

said image-forming optical system according to any one of claims 1, 3, 4 and an electronic image pickup device placed at a position where it receives an object image formed by said image-forming optical system;

a signal processor, said signal processor being constructed to process an electronic signal obtained through photoelectric conversion by said electronic image pickup device;

a display device for observably displaying the object image received with said electronic image pickup device; and a recording member for recording image information concerning the object image received with said electronic image pickup device, said recording member being incorporated in said electronic camera apparatus or removably loaded thereinto;

wherein said signal processor has a display processing function to display the object image received with said electronic image pickup device on said display device and a recording processing function to record the object image received with said electronic image pickup device onto said recording medium.

8. A compact photographic apparatus comprising:

an image-forming optical system for forming an image of an object, image-forming optical system comprising:
a stop;
a first prism; and
a second prism;
said first prism and said second prism being provided between said stop and an image plane;
said first prism including, in order from an object side thereof:
a first prism entrance surface through which a light beam passing through said stop enters said first prism;
a first prism first reflecting surface that reflects the light beam entering said first prism;
wherein said first prism first reflecting surface and said first prism exit surface are an identical surface, and the light beam entering through said first prism entrance surface is incident on said first prism exit surface at an angle exceeding a total reflection critical angle, thereby allowing said first prism exit surface to produce a reflecting action so as to function as said first prism first reflecting surface;
said second prism including:
a second prism entrance surface through which the light beam exiting from said first prism exit surface enters said second prism;
a second prism first reflecting surface that reflects the light beam entering said second prism;
a second prism second reflecting surface that reflects the light beam reflected by said second prism first reflecting surface; and
a second prism exit surface through which the light beam reflected by said second prism second reflecting surface exits from said second prism;

wherein said second prism second reflecting surface and said second prism entrance surface are an identical surface, and the light beam reflected from said second prism first reflecting surface is incident on said second prism entrance surface at an angle exceeding a total reflection critical angle, thereby allowing said second prism entrance surface to produce a reflecting action so as to function as said second prism second reflecting surface, and a first prism second reflecting surface that reflects the light beam reflected by said first prism first reflecting surface;

an electronic image pickup device placed at a position where it receives an object image formed by said image-forming optical system; and a signal processor, said signal processor being constructed to process an electronic signal obtained through photoelectric conversion by said electronic image pickup device;

wherein an optical path is folded in said first prism and said second prism and said first prism and said second prism are placed close to each other in a direction (Z-axis direction) in which a distance (D) from the stop of said image-forming optical system to said electronic image pickup device is reduced so that said distance (D) is not more than 25 millimeters (D≦25 millimeters), and further said first prism and said second prism are arranged so that said distance D is not less than 3 millimeters (D≧3 millimeters) to lead a light beam having a field angle of at least 10° (ω>10°) to said electronic image pickup device by folding said light beam in said first prism and said second prism.

9. A compact photographic apparatus according to claim 8, wherein the optical path is folded in said first prism and said second prism and said first prism and said second prism are placed close to each other in the direction (Z-axis direction) in which the distance D from the stop of said image-forming optical system to said electronic image pickup device is reduced so that said distance (D) is not more than 15 millimeters (D≦15 millimeters).

10. A personal computer system comprising:

said information processing apparatus according to claim 6;

wherein said input unit is a keyboard, and said image-forming optical system and said electronic image pickup device are incorporated in a peripheral portion of said display device or in a peripheral portion of said keyboard.

11. A telephone apparatus comprising:

an image-forming optical system for forming an image of an object, said image-forming optical system comprising:
a stop;
a first prism; and
a second prism;
said first prism and said second prism being provided between said stop and an image plane;
said first prism including, in order from an object side thereof:
a first prism entrance surface through which a light beam passing through said stop enters said first prism;
a first prism first reflecting surface that reflects the light beam entering said first prism;
a first prism second reflecting surface that reflects the light beam reflected by said first prism first reflecting surface; and a first prism exit surface through which the light beam reflected by said first prism second reflecting surface exits from said first prism;

wherein said first prism first reflecting surface and said first prism exit surface are an identical surface, and the light beam entering through said first prism entrance surface is incident on said first prism exit surface at an angle exceeding a total reflection critical angle, thereby allowing said first prism exit surface to produce a reflecting action so as to function as said first prism first reflecting surface;

said second prism including:

a second prism entrance surface through which the light beam exiting from said first prism exit surface enters said second prism;

a second prism first reflecting surface that reflects the light beam entering said second prism;

a second prism second reflecting surface that reflects the light beam reflected by said second prism first reflecting surface; and a second prism exit surface through which the light beam reflected by said second prism second reflecting surface exits from said second prism;

wherein said second prism second reflecting surface and said second prism entrance surface are an identical surface, and the light beam reflected from said second prism first reflecting surface is incident on said second prism entrance surface at an angle exceeding a total reflection critical angle, thereby allowing said second prism entrance surface to produce a reflecting action so as to function as said second prism second reflecting surface, an electronic image pickup device placed at a position where it receives an object image formed by said image-forming optical system;

an antenna for transmitting and receiving telephone signals;

an input unit for inputting signals, e.g. a telephone number; and a signal processing unit for converting the object image received with said electronic image pickup device into a transmittable signal.

12. An information reproducing apparatus comprising:

an image-forming optical system for forming an image of an object, said image-forming optical system comprising:

a stop;

a first prism; and a second prism;

said first prism and said second prism being provided between said stop and an image plane;

said first prism including, in order from an object side thereof:

a first prism entrance surface through which a light beam passing through said stop enters said first prism;

a first prism first reflecting surface that reflects the light beam entering said first prism;

a first prism second reflecting surface that reflects the light beam reflected by said first prism first reflecting surface; and a first prism exit surface through which the light beam reflected by said first prism second reflecting surface exits from said first prism;

wherein said first prism first reflecting surface and said first prism exit surface are an identical surface, and the light beam entering through said first prism entrance surface is incident on said first prism exit surface at an angle exceeding a total reflection critical angle, thereby allowing said first prism exit surface to produce a reflecting action so as to function as said first prism first reflecting surface;

said second prism including:

a second prism entrance surface through which the light beam exiting from said first prism exit surface enters said second prism;

a second prism first reflecting surface that reflects the light beam entering said second prism;

a second prism second reflecting surface that reflects the light beam reflected by said second prism first reflecting surface; and a second prism exit surface through which the light beam reflected by said second prism second reflecting surface exits from said second prism;

wherein said second prism second reflecting surface and said second prism entrance surface are an identical surface, and the light beam reflected from said second prism first reflecting surface is incident on said second prism entrance surface at an angle exceeding a total reflection critical angle, thereby allowing said second prism entrance surface to produce a reflecting action so as to function as said second prism second reflecting surface, an electronic image pickup device placed at a position where it receives an object image formed by said image-forming optical system;

an illuminating member for illuminating an object having a sound signal recorded in a form of one of a bar code and a dot pattern;

a signal processor constructed to provide speech recognition of the sound signal received in a form of the object image by said electronic image pickup device from said object; and a sound generating member for transmitting the recognized sound signal to an operator's ear as a sound.

* * * * *